United States Patent
Kozaki

(10) Patent No.: US 9,347,489 B2
(45) Date of Patent: May 24, 2016

(54) MAGNETIC BEARING DEVICE AND VACUUM PUMP

(71) Applicant: SHIMADZU CORPORATION, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 368 days.

(21) Appl. No.: 14/154,654

(22) Filed: Jan. 14, 2014

(65) Prior Publication Data

US 2014/0219841 A1     Aug. 7, 2014

(30) Foreign Application Priority Data

Feb. 6, 2013    (JP) .................................. 2013-021681

(51) Int. Cl.
| | |
|---|---|
| F04D 29/048 | (2006.01) |
| F16C 32/04 | (2006.01) |
| F04D 19/04 | (2006.01) |
| F04D 27/00 | (2006.01) |
| F04D 29/058 | (2006.01) |

(52) U.S. Cl.
CPC ............. *F16C 32/04* (2013.01); *F04D 19/042* (2013.01); *F04D 27/001* (2013.01); *F04D 29/058* (2013.01); *F16C 32/0446* (2013.01); *F16C 32/0451* (2013.01); *F16C 32/0455* (2013.01); *F16C 2360/44* (2013.01)

(58) Field of Classification Search
CPC ...................................................... F04D 29/048
USPC ........................................ 318/607, 606, 560
See application file for complete search history.

(56) References Cited

U.S. PATENT DOCUMENTS

| | | | | |
|---|---|---|---|---|
| 6,498,451 | B1* | 12/2002 | Boules ................. | B62D 5/0403 |
| | | | | 318/400.06 |
| 6,515,388 | B1 | 2/2003 | Moriyama et al. | |
| 7,679,248 | B2 | 3/2010 | Kozaki et al. | |

FOREIGN PATENT DOCUMENTS

| | | |
|---|---|---|
| JP | 2000-060169 | 2/2000 |
| JP | 2001-177919 | 6/2001 |
| JP | 2005-240952 A | 9/2005 |
| JP | 2006-308074 | 11/2006 |

OTHER PUBLICATIONS

English translation of Chinese Office Action dated Jan. 28, 2016 for corresponding Chinese Application No. 201310680519.4.

* cited by examiner

*Primary Examiner* — David S Luo
(74) *Attorney, Agent, or Firm* — Renner, Otto, Boisselle & Sklar, LLP

(57) ABSTRACT

A predetermined timing is a timing at which the sampling timing is in a vicinity of a maximum peak position of the carrier wave signal and a timing at which the sampling timing is in a vicinity of a minimum peak position. The demodulation arithmetic section outputs, as the demodulation calculated result, a value d3 calculated with $d3=(d1-d2)/2$ when a data value of the digital signal sampled in the vicinity of the maximum peak position is denoted by d1 and a data value of the digital signal sampled in the vicinity of the minimum peak position is denoted by d2.

10 Claims, 16 Drawing Sheets

(a) POSITION INFORMATION SIGNAL $F_{sig}(t)$ (b) CARRIER WAVE $F_{carrier}(t)$ (c) MODULATION WAVE $F_{AM}(t)$ (d) $F_{std}(t)$ (e) DIFFERENCE SIGNAL $F_{sub}(t)$

US 9,347,489 B2

MAGNETIC BEARING DEVICE AND VACUUM PUMP

BACKGROUND OF THE INVENTION

1. Field of the Invention

The present invention relates to a magnetic bearing device, and a vacuum pump having the magnetic bearing device.

2. Description of the Related Art

In a device such as a magnetic bearing type turbo-molecular pump in which a rotor is supported by a magnetic bearing device in a non-contact manner, magnetic attraction of an electromagnet (a current of the electromagnet) is feedback-controlled in real time based on a deviation (displacement) between a levitation position and a target position of the rotor in order to maintain a levitating state of the rotor on a predetermined target position.

A system in which displacement is detected by a dedicated displacement sensor is used mainly. In recent years, due to compactification, price reduction and reliability improvement, a sensorless (self sensing) device in which a dedicated sensor is omitted and an electromagnet for generating a levitation control force is used as not only a conventional actuator function but also a sensing function (inductance system) is being put to practical use.

In the inductance system, a high frequency carrier wave (sensor carrier) is applied to a dedicated sensor or an electromagnet coil, and an amplitude of the sensor carrier is modulated due to an inductance change caused by a levitation gap and is remodulated. As a result, a levitation gap signal (displacement signal) is obtained. In the demodulating process, a lot of systems in which an AD converter synchronously samples a modulation wave signal by applying a digital technique so as to be taken in, namely, direct systems in which a smoothing process that causes a delay is not necessary are proposed. Known direct type sensing is disclosed in, for example, JP 2006-308074 A, JP 2000-60169 A, and JP 2001-177919 A.

The technique disclosed in JP 2006-308074 A has a dedicated sensor, and a relationship between a sensor carrier frequency fc and a sampling frequency fs at a time of sampling a modulation wave signal is such that fs=2fc or fs=fc/n (n is a natural number). Since only a sensor carrier signal voltage is applied to the dedicated sensor, normally S/N of a signal is satisfactory. However, like a case where a device including a magnetic bearing is arranged so that the electromagnet and the dedicated sensor are extremely close to each other in order to realize compactification, when a magnetic flux caused by a control current for exciting the electromagnet exercises an effect on a signal of a dedicated sensor coil, a control current component (noise component) might be mixed in a signal component modulated by rotor displacement due to the effect of the magnetic flux.

For this reason, normally a band-pass filter (the band-pass filter mainly for the sensor carrier frequency fc) provided right in front of the AD converter filtrates the most part. However, in order to completely remove a noise component, a Q value of the band-pass filter is further increased and a band should be narrowed. However, when the band of the band-pass filter is narrowed, the modulated displacement signal is greatly delayed from an original signal. As a result, the magnetic bearing control itself is deteriorated, and its application is limited. For this reason, a noise component remains in an input signal of the AD converter, and a noise effect is exercised on the demodulated signal. Therefore, a vibration component that is not actually displaced (vibrated) is mixed in the demodulated rotor displacement signal, and displacement information is directly fed back and levitation control is made. As a result, the rotor is forcibly vibrated by the noise component, and its reaction force is transmitted to the stator side and occasionally causes a device vibration.

The technique disclosed in JP 2000-60169 A relates to both the dedicated sensor and sensorless devices. In devices having the dedicated sensor, a square wave signal obtained by inverting a code at every sampling time under a condition that fs=2fc is generated by a digital process and is output from the DA converter, and the output signal is modulated as a sensor carrier signal by the displacement signal (rotor displacement) in a sensor. A modulated wave of the signal is synchronized with a peak timing at the same frequency fs (=2fc) so as to be fetched. In the demodulating process, since the signal data fetched by the AD converter is processed by inverting a code at everyone sampling (a code is inverted at a minimum peak time of the sensor carrier), similarly to the case of the invention described in JP 2006-308074 A, a problem of vibration generation arises.

Further, in the case of the sensorless type, the sensor carrier signal is superimposed on an electromagnet driving current signal and the superimposed signal is output from the DA converter so as to excite the electromagnet via a power amplifier. An amplitude of the superimposed sensor carrier signal is modulated by an electromagnet coil. For this reason, an amplitude modulation signal including the displacement signal component is extracted, and the modulating process that synchronizes with the sensor carrier is executed similarly to the case with the dedicated sensor. However, in the case of the sensorless type, since the displacement signal is sensed by the electromagnet instead of the dedicated sensor, not only the modulation signal of the sensor carrier signal to be superimposed but also a control current signal is mixed at an equivalent or more signal level. Therefore, a control current component (noise component) to be mixed in the amplitude modulation signal is increased more than that in the case of the dedicated sensor type.

The technique described in JP 2001-177919 A relates to the sensorless type. A sensor carrier component for sensing is superimposed on a driving current for exciting an electromagnet. The basic signal process is similar to that described in JP 2000-60169 A, but they are different in the following point. That is to say, the sensor carrier (carrier wave) to be superimposed on each of paired electromagnets opposed to each other across the rotor is applied in an opposite-phase relationship. As a result, an amplitude modulation signal including a displacement signal component is efficiently separated so as to be capable of being extracted from a control current component. However, due to the similar reason to the case of the sensorless type in JP 2000-60169 A, a problem that a noise is mixed in a displacement modulation signal arises.

SUMMARY OF THE INVENTION

A magnetic bearing device for supporting a body to be supported using an electromagnet in a non-contact manner, comprises a sine wave discrete value generating section for generating a sine wave discrete value by a digital arithmetic process; a carrier wave generating section for generating a carrier wave signal based on the sine wave discrete value; a displacement detecting section for modulating the carrier wave signal depending on a supporting position of the body to be supported so as to output a modulation wave signal; an AD converting section for AD-converting the modulation wave signal into a digital signal at a sampling frequency fs that satisfies $fc=(n+\frac{1}{2}) \cdot fs$ (n is an integer of not less than 0) and at a predetermined timing that synchronizes with the sine wave discrete value when a frequency of the carrier wave signal is denoted by fc; a demodulation arithmetic section for performing demodulation arithmetic based on the AD-converted digital signal; and a controller for controlling a current of the electromagnet based on a demodulation calculated result of the demodulation arithmetic section so as to control the supporting position of the body to be supported. The predetermined timing is a timing at which the sampling timing is in a vicinity of a maximum peak position of the carrier wave signal and a timing at which the sampling timing is in a vicinity of a minimum peak position, and the demodulation arithmetic section outputs, as the demodulation calculated result, a value d3 calculated with d3=(d1−d2)/2 when a data value of the digital signal sampled in the vicinity of the maximum peak position is denoted by d1 and a data value of the digital signal sampled in the vicinity of the minimum peak position is denoted by d2.

Preferably the vicinity of the maximum peak position is set to a phase range that is a ¼ period of a carrier wave period (1/fc) centered on the maximum peak position, and the vicinity of the minimum peak position is set to a phase range that is a ¼ period of the carrier wave period (1/fc) centered on the minimum peak position.

Preferably at each time when the data values d1 and d2 are sampled, the demodulation arithmetic section outputs the value d3 based on the data value obtained by the sampling and the data value obtained by the sampling shortly before the sampling.

Preferably at each time when any one of the data values d1 and d2 is sampled, the demodulation arithmetic section outputs the value d3 based on the data value obtained by the sampling and the data value obtained by the sampling shortly before the sampling.

A magnetic bearing device comprises a pair of electromagnets provided to a control axis, and arranged to be opposed with respect to a rotor shaft, the control axis provided in plural, a carrier wave generating section for generating a carrier wave signal for detecting a change in a levitation position of the rotor shaft; a plurality of excitation amplifiers for controlling a voltage to be applied to each of the electromagnets based on an electromagnet control signal on which the carrier wave signal is superimposed so as to supply an electromagnet current to each of the electromagnets; a plurality of current sensors for detecting the electromagnet currents; a modulation wave signal generating section for generating a modulation wave signal including levitation position change information based on detection signals of the current sensors in pairs provided correspondingly to the pair of electromagnets arranged in the opposed manner; an AD converting section for AD-converting the modulation wave signal into a digital signal at a sampling frequency fs that satisfies fc=(n+½)·fs (n is an integer of not less than 0) and at a predetermined timing that synchronizes with the carrier wave signal when a frequency of the carrier wave signal is denoted by fc; a demodulation arithmetic section for performing demodulation arithmetic based on the AD-converted digital signal; and a controller for generating the electromagnet control signal based on a demodulation calculated result of the demodulation arithmetic section so as to control a levitation position of the rotor shaft. The predetermined timing is a timing at which the sampling timing is in a vicinity of a maximum peak position of the carrier wave signal and a timing at which the sampling timing is in a vicinity of a minimum peak position, and the demodulation arithmetic section outputs, as the demodulation calculated result, a value d3 calculated with d3=(d1−d2)/2 when a data value of the digital signal sampled in the vicinity of the maximum peak position is denoted by d1, and a data value of the digital signal sampled in the vicinity of the minimum peak position is denoted by d2.

Preferably the vicinity of the maximum peak position is set to a phase range that is a ¼ period of a carrier wave period (1/fc) centered on the maximum peak position, and the vicinity of the minimum peak position is set to a phase range that is a ¼ period of the carrier wave period (1/fc) centered on the minimum peak position.

Preferably at each time when the data values d1 and d2 are sampled, the demodulation arithmetic section outputs the value d3 based on the data value obtained by the sampling and the data value obtained by the sampling shortly before the sampling.

Preferably at each time when any one of the data values d1 and d2 is sampled, the demodulation arithmetic section outputs the value d3 based on the data value obtained by the sampling and the data value obtained by the sampling shortly before the sampling.

A vacuum pump comprises a pump rotor including an evacuating function section; a motor for driving the pump rotor; and the magnetic bearing device for supporting the rotor shaft of the pump rotor in a magnetic levitation manner.

DETAILED DESCRIPTION OF PREFERRED EMBODIMENTS

Embodiments for carrying out the present invention are described below with reference to the drawings.

First Embodiment

Figure 1:
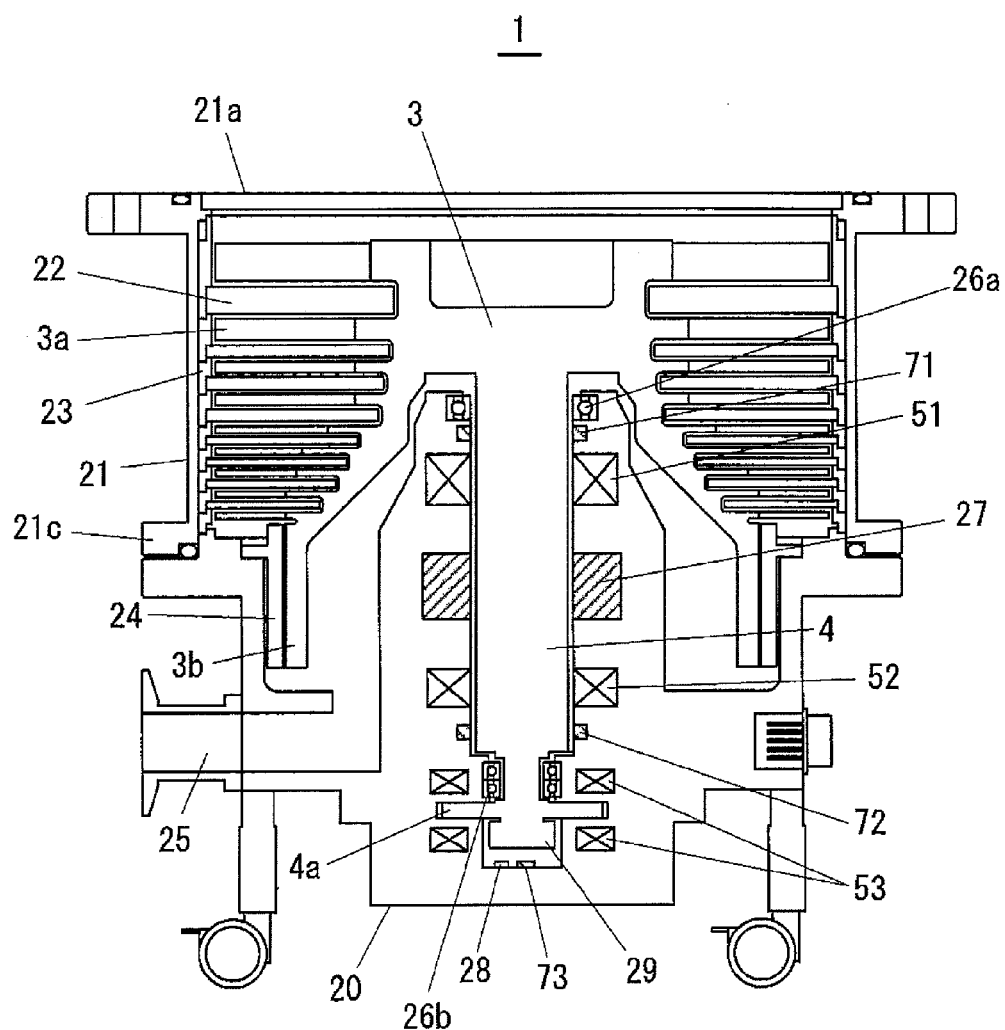
FIG. 1 is a diagram illustrating a schematic constitution of a magnetic bearing type turbo-molecular pump having a displacement sensor type magnetic bearing device.

FIG. 1 is a diagram illustrating a schematic constitution of a magnetic bearing type turbo-molecular pump having a displacement sensor type magnetic bearing device. The turbomolecular pump is constituted by a pump unit 1 and a control unit for controlling to drive the pump unit 1. In FIG. 1, illustration of the control unit is omitted.

A rotor shaft 4 is supported by magnetic bearings 51 and 52 in a radial direction and magnetic bearings 53 in an axial direction in a non-contact manner. The magnetic bearings 53 are arranged so as to sandwich a thrust disc 4a fixed to a lower part of the rotor shaft 4 in the axial direction. A levitating position of the rotor shaft 4 is detected by radial sensors 71 and 72 and an axial sensor 73 as displacement sensors. An inductance type displacement sensor constituted so that a coil is wound around a sensor core is used as the sensors 71 to 73.

A rotor 3 that is magnetically levitated by the magnetic bearings so as to be freely rotatable is driven to be rotated by a motor 27 at a high speed. A brushless DC motor or the like is used as the motor 27. FIG. 1 schematically illustrates the motor 27, but more specifically the portion indicated by Reference symbol 27 includes a motor stator, and a motor rotor is provided on the rotor shaft 4 side.

The rotation of the rotor 3 is detected by a rotation sensor 28. A sensor target 29 is provided on a lower end of the rotor shaft 4 driven to be rotated by the motor 27. The sensor target 29 rotates integrally with the rotor shaft 4. The axial displacement sensor 73 and the rotation sensor 28 are arranged on a position opposed to a lower surface of the sensor target 29. When the magnetic bearings do not operate, the rotor shaft 4 is supported by emergency mechanical bearings 26a and 26b.

The rotor 3 is formed with a plurality of stages of rotor blades 3a and cylindrical sections 3b constituting a rotation-side exhaust function section. On the other hand, a stationary blade 22 and a screw stator 24 as a stationary side exhaust function section are provided to the stationary side. A plurality of stages of the stationary blades 22 and the rotor blades 3a are arranged alternately in the axial direction. The screw stator 24 is provided on an outer peripheral side of the cylindrical section 3b with a predetermined gap.

Each of the stationary blades 22 is placed on a base 20 via each spacer ring 23. When a fixed flange 21c of a pump case 21 is fixed to the base 20 by a bolt, the laminated spacer rings 23 are held between the base 20 and the pump case 21 so that the stationary blades 22 are located. The base 20 is provided with an exhaust port 25, and a back pump is connected to the exhaust port 25. When the rotor 3 is magnetically levitated and is simultaneously driven to be rotated by the motor 27 at a high speed, gaseous molecules on a suction port 21a side are exhausted to the exhaust port 25.

Figure 2:
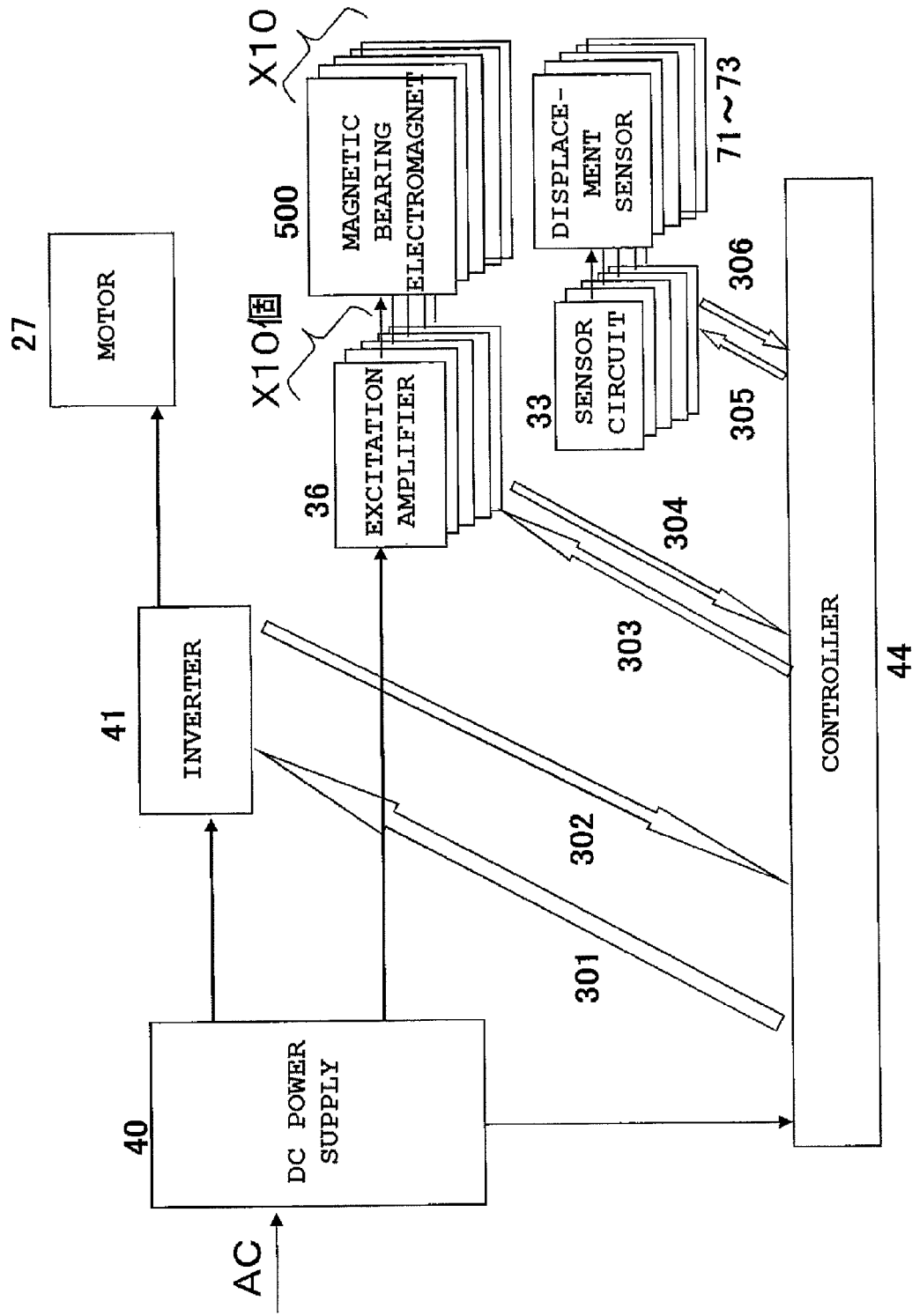
FIG. 2 is a block diagram illustrating a schematic constitution of a control unit.

FIG. 2 is a block diagram illustrating a schematic constitution of a control unit. An AC input from the outside is converted into a DC by a DC power supply 40 provided to the control unit. The DC power supply 40 generates a power supply for an inverter 41, a power supply for an excitation amplifier 36, and a power supply for a controller 44.

The inverter 41 for supplying a current to the motor 27 is provided with a plurality of switching elements. An on/off operation of the switching elements is controlled by the controller 44 so that the motor 27 is driven.

Ten magnetic bearing electromagnets 500 shown in FIG. 2 are magnetic bearing electromagnets provided to magnetic bearings 51, 52 and 53, respectively. The magnetic bearings used in the turbo-molecular pump shown in FIG. 1 are five-axis control type magnetic bearings. The magnetic bearings 51 and 52 in the radial direction are two-axis magnetic bearings, and each of the bearings has two pairs (four) of the magnetic bearing electromagnets 500. Further, the magnetic bearings 53 in the axial direction is an one-axis magnetic bearing, and has a pair (two) of the magnetic bearing electromagnets 500. The excitation amplifier 36 for supplying a current to the magnetic bearing electromagnets 500 is provided to each of the magnetic bearing electromagnets 500, and thus ten excitation amplifiers 36 in total are provided to the control unit.

The controller 44 for controlling the driving of the motor 27 and the driving of the magnetic bearings is constituted by, for example, a digital arithmetic unit such as FPGA (Field Programmable Gate Array) and its peripheral circuit. As to the motor control, a PWM control signal 301 for controlling the on/off operation of the plurality the switching elements provided to the inverter 41 is input from the controller 44 into the inverter 41, and a signal 302 relating to a phase voltage and a phase current of the motor 27 is input from the inverter 41 into the controller 44. As to the control of the magnetic bearings, a PWM gate driving signal 303 for controlling the on/off operation of the switching elements included in the excitation amplifiers 36 is input from the controller 44 into the excitation amplifiers 36, and an electromagnet current signal 304 relating to the magnetic bearing electromagnets 500 is input from the excitation amplifiers 36 into the controller 44. Further, a sensor carrier signal (carrier wave signal) 305 is input from the controller 44 into sensor circuits 33, and a sensor signal 306 modulated by displacement is input from the sensor circuits 33 into the controller 44.

Figure 3:
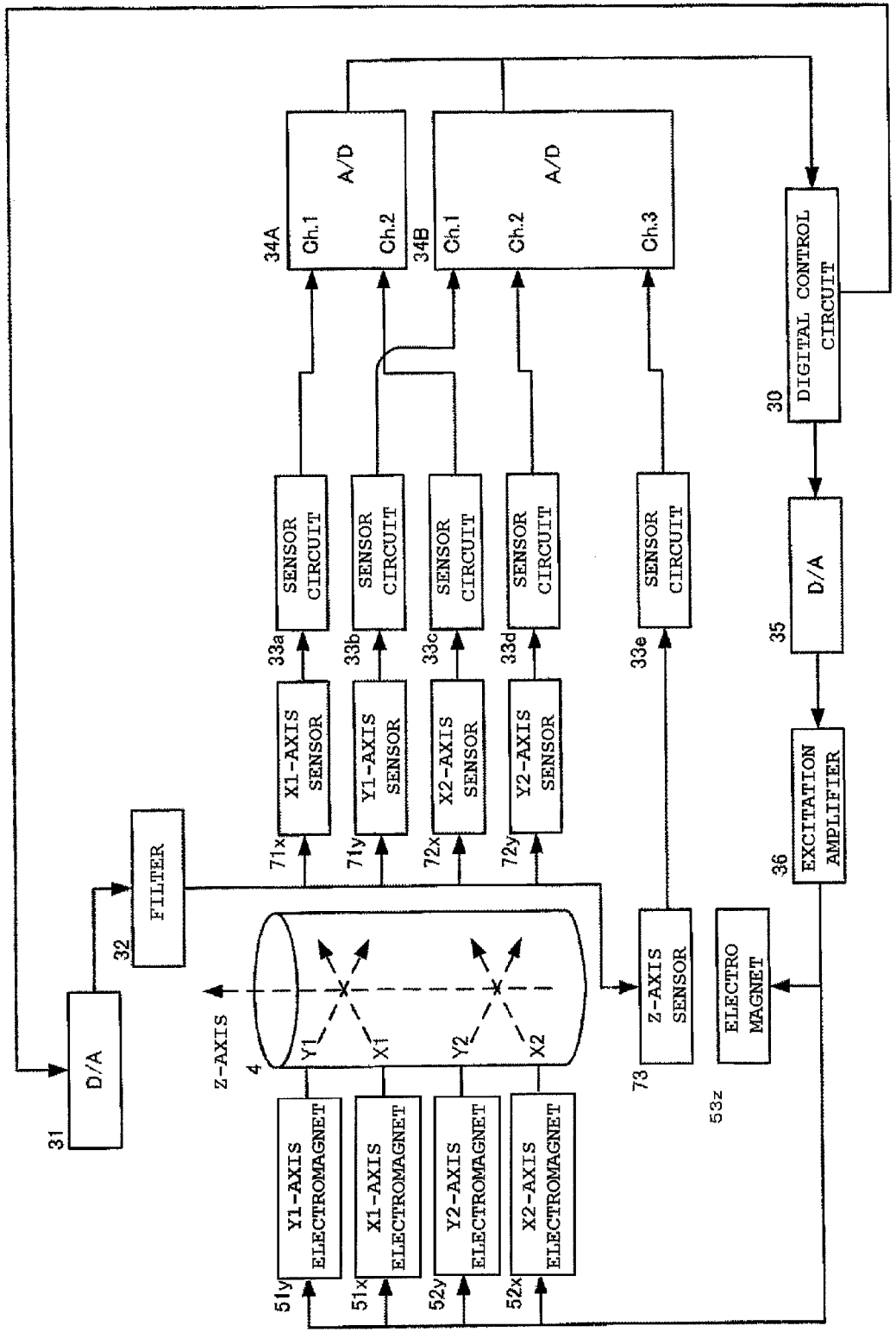
FIG. 3 is a block diagram illustrating a constitution of a five-axis control type magnetic bearing.

FIG. 3 is a block diagram illustrating a constitution of a five-axis control type magnetic bearing. In FIG. 3, a digital control circuit 30, a DA converter 31, a filter 32, an AD converter 34 (34A and 34B) and a DA converter 35 correspond to the controller 44 in FIG. 2. The radial magnetic bearing 51 has an X1-axis electromagnet 51$x$ and a Y1-axis electromagnet 51$y$, and the radial magnetic bearing 52 has an X2-axis electromagnet 52$x$ and a Y2-axis electromagnet 52$y$. Each of the electromagnets 51$x$, 51$y$, 52$x$, and 52$y$ is constituted by one electromagnet 500, and they are opposed to each other across the rotor shaft 4 (see FIG. 2). An electromagnet 53$z$ of the axial magnetic bearing 53 is constituted by a pair of the magnetic bearing electromagnets 500. On the other hand, the radial sensor 71 has an X1-axis sensor 71$x$ and a Y1-axis sensor 71$y$ correspondingly to the X1-axis electromagnet 51$x$ and the Y1-axis electromagnet 51$y$. Similarly, the radial sensor 72 has an X2-axis sensor 72$x$ and a Y2-axis sensor 72$y$ correspondingly to the X2-axis electromagnet 52$x$ and the Y2-axis electromagnet 52$y$.

As described above, the radial sensors 71 (71$x$ and 71$y$) and 72 (72$x$ and 72$y$) and the axial sensor 73 are inductance type displacement sensors. They convert gap displacement into an electric signal by using an impedance change of the sensor section caused by the gap displacement. The sensor carrier signal of frequency fc generated by the digital control circuit 30 is converted into an analog signal by the DA converter 31, and is applied to the sensors 71$x$, 71$y$, 72$x$, 72$y$ and 73 via the filter 32.

Amplitudes of the sensor carrier signals (carrier wave signals) applied to the sensors 71$x$, 71$y$, 72$x$, 72$y$ and 73 are modulated in accordance with the impedance change of the sensor sections caused by the gap displacement. The modulation wave signal (sensor signal) whose amplitude is modulated is input into the AD converters 34A and 34B via sensor circuits 33$a$ to 33$e$. The X1-axis and X2-axis sensor signals are input into the AD converter 34A, and the Y1-axis, Y2-axis and Z-axis sensor signals are input into the AD converter 34B. Analog signals from the sensor circuits 33$a$ to 33$e$ are converted into digital values sequentially by the AD converters 34A and 34B, and are input into the digital control circuit 30.

The digital control circuit 30 calculates an electromagnet current to be applied to the electromagnets 51$x$, 51$y$, 52$x$, 52$y$, and 53 based on a magnetic levitation control constant stored in advance and position information converted into a digital value, and outputs an electromagnet current control signal. The electromagnet current control signal is converted into an analog value by the DA converter 35 and is then input into the excitation amplifier 36. FIG. 3 illustrates only one excitation amplifier 36, but actually as shown in FIG. 2, the excitation amplifiers 36 whose number is the same (10) as that of the magnetic bearing electromagnets 500 are provided, and an electromagnet current is supplied from each of the excitation amplifier 36 to each of the electromagnets 500.

Figure 4:
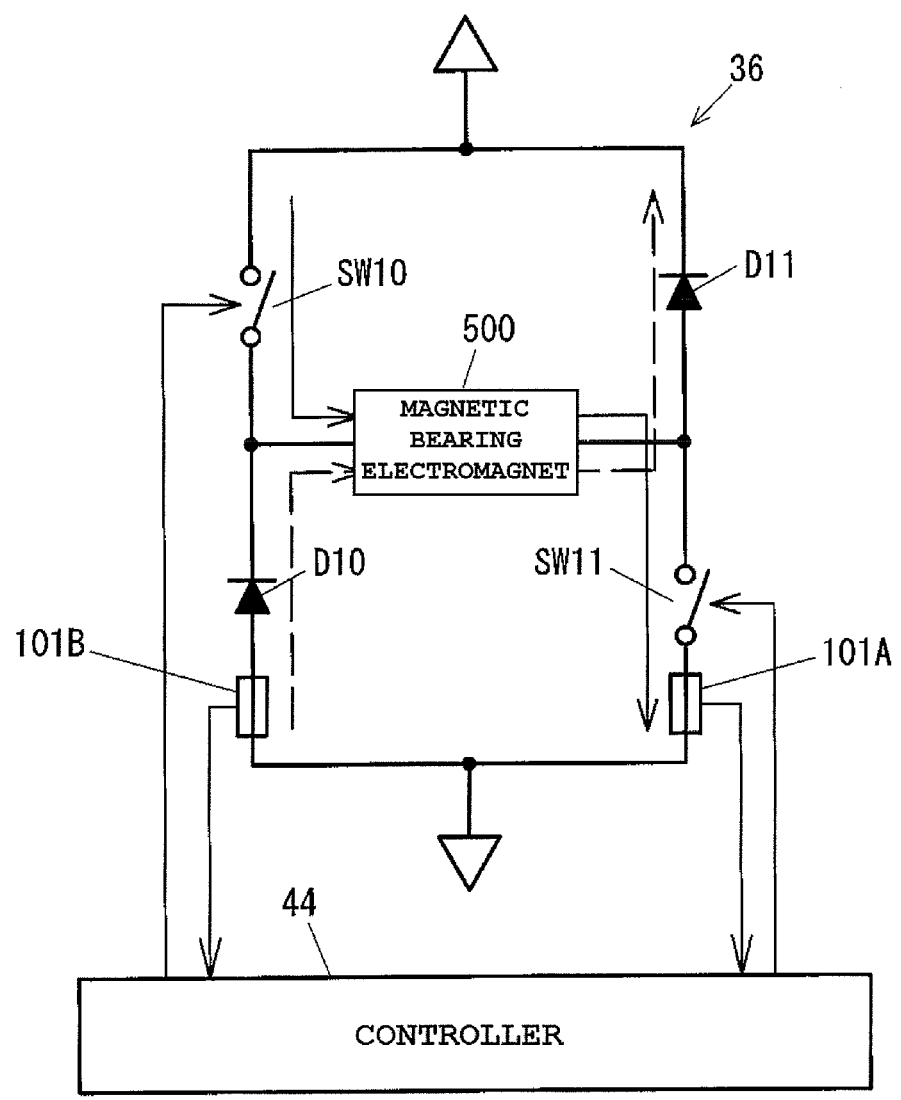
FIG. 4 is a diagram illustrating a constitution of an excitation amplifier.

FIG. 4 is a diagram illustrating a constitution of the excitation amplifier 36 provided correspondingly to each of the magnetic bearing electromagnets 500. The excitation amplifier 36 is constituted so that the switching element and diode are connected in series as one set, and two sets are connected in parallel. The magnetic bearing electromagnet 500 is connected between the switching element SW10 and the diode D10, and between the switching element SW11 and the diode D11.

The switching elements SW10 and SW11 are controlled so as to be on or off (conductive or interrupted) based on the PWM gate driving signal 303 from the controller 44. The switching elements SW10 and SW11 are turned on/off simultaneously, and when both of them are on, an electromagnet current flows as indicated by an arrow of a solid line, but when both of them are off, an electromagnet current flows as indicated by an arrow of a broken line. A current value at the on time is measured by a current sensor 101A, and a current value at an off time is measured by a current sensors 101B. A shunt resistor is used as the current sensors 101A and 101B, and a voltage of the shunt resistor is used as a current detection signal.

Figure 5:
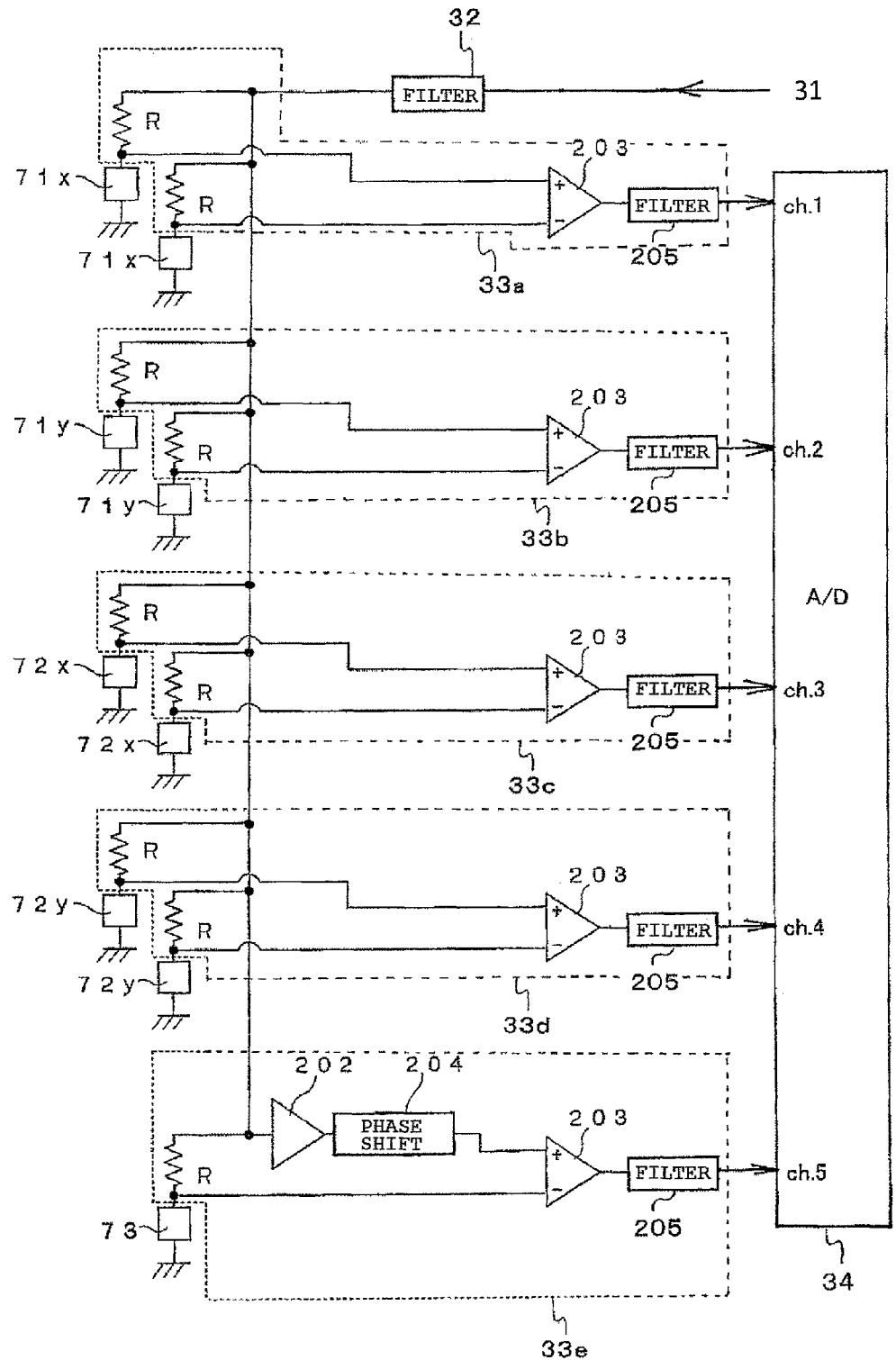
FIG. 5 is a diagram illustrating sensors and sensor circuits in detail.

FIG. 5 illustrates sensors 71x to 73 and the sensor circuits 33a to 33e of the respective axes in FIG. 3 in detail. The X1-axis sensor 71x, the Y1-axis sensor 71y, the X2-axis sensor 72x, and the Y2-axis sensor 72y in the radial direction have the same constitution, and a difference between the output signals from the paired sensors is obtained. On the other hand, as to an output signal from the axial sensor 73, a difference between an output signal from the sensor 73 and signal obtained by allowing the sensor carrier signal to pass through a gain adjusting section 202 and a phase shift circuit 204 is calculated.

Figure 6:
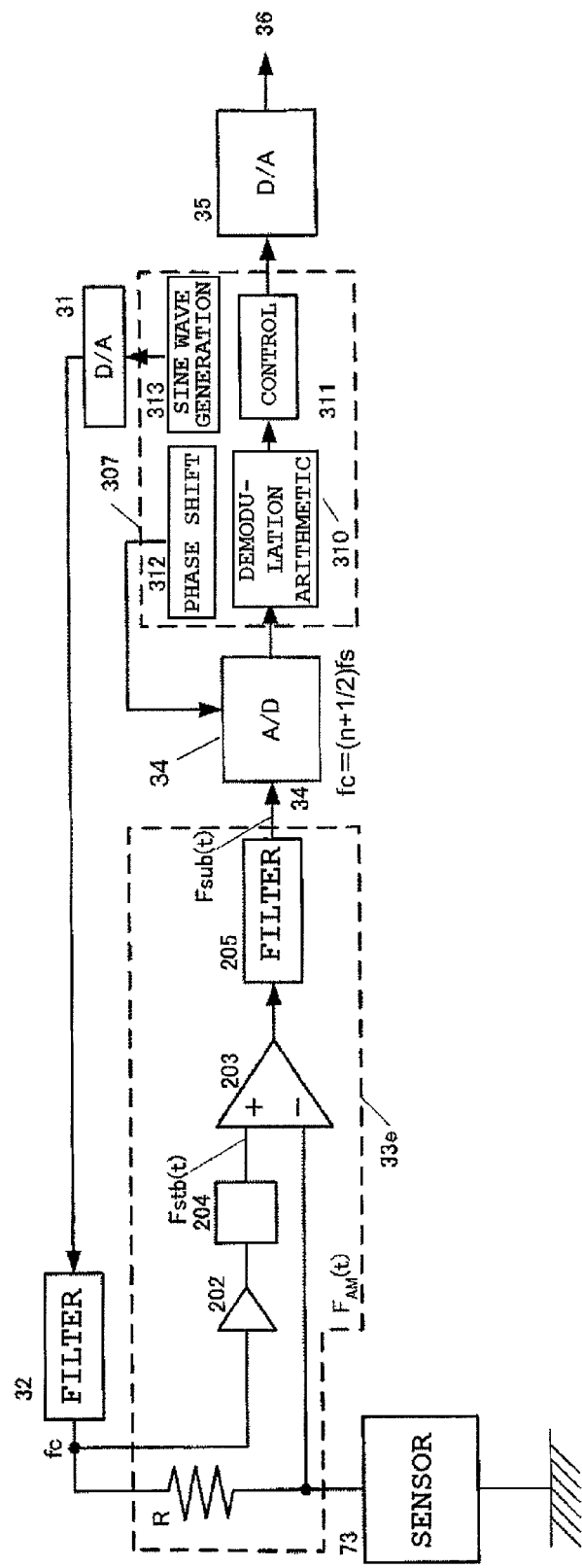
FIG. 6 is a diagram illustrating one example of a control block relating to an axial sensor.

FIG. 6 illustrates one example of a control block relating to the axial sensor 73 (z-axis direction) shown in FIGS. 3 and 5. A sine wave discrete value generated by the sine wave discrete value generating section 313 of the digital control circuit 30 is converted into an analog signal by the DA converter 31, and the analog signal is output to the filter 32. Since the output sensor carrier signal has a step shape including harmonics, it is filtered by the filter 32 including a low-pass filter or a band-pass filter, so that the smooth sensor carrier signal can be obtained. The sensor carrier signal is applied to the sensor 73 that is connected in series through a resistor R. The sensor carrier signal Fcarrier (t) output from the filter 32 is expressed by Formula (1) where a sensor carrier frequency is denoted by fc;

$$F\text{carrier}(t) = A \sin(2\pi fct) \quad (1)$$

An amplitude of the sensor carrier signal applied to the axial sensor 73 is modulated by an impedance change that changes depending on a position of the rotor shaft 4 so that the sensor carrier signal becomes an amplitude modulated wave FAM(t). When a position information signal is denoted by Fsig(t), the amplitude modulated wave FAM(t) is expressed by Formula (2). Here, φ denotes a phase difference with respect to the sensor carrier signal.

$$FAM(t) = (A + F\text{sig}(t))\sin(2\pi fct + \phi) \quad (2)$$

Figure 7:
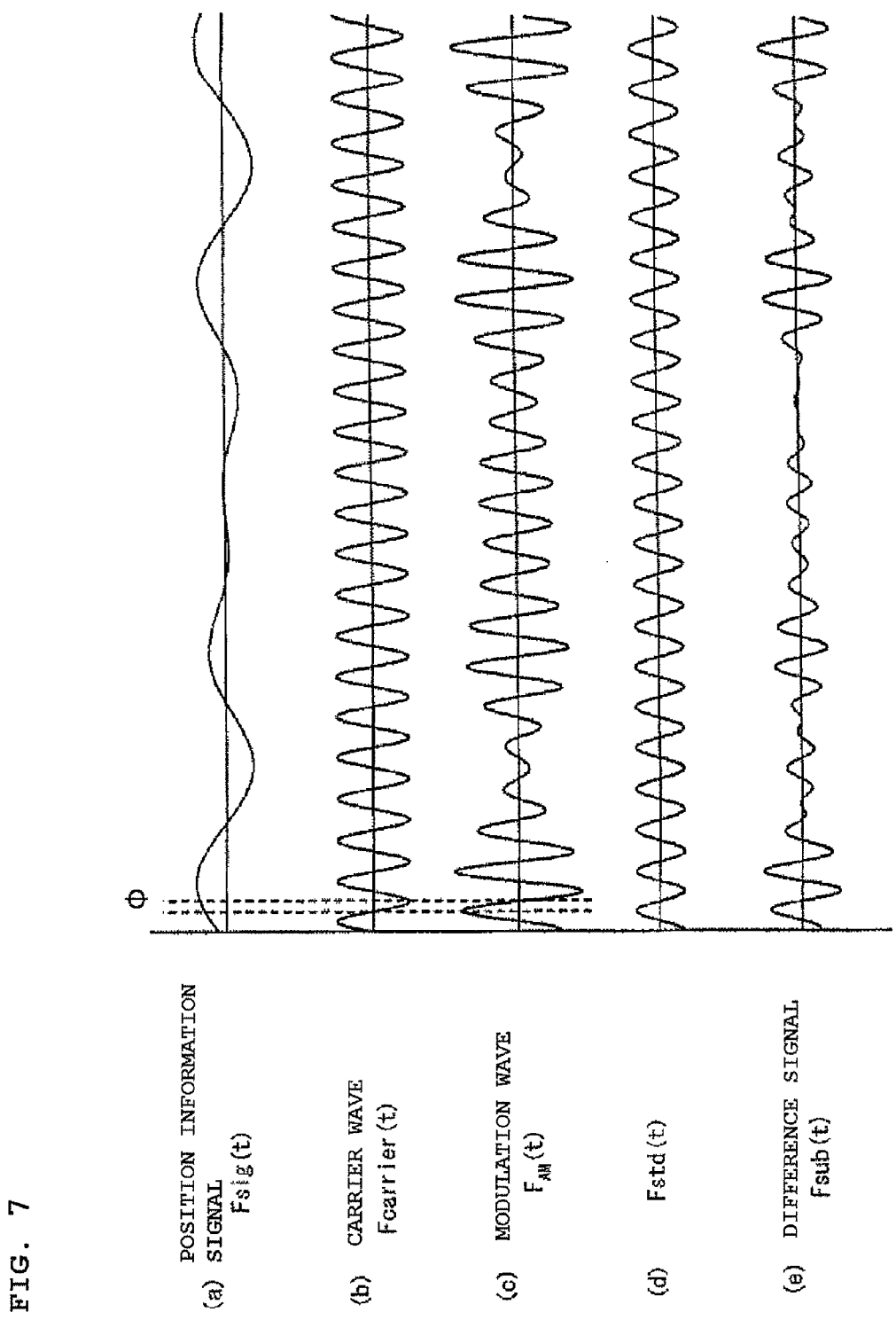
FIG. 7 is a diagram illustrating an example of signal waveforms.

FIG. 7 illustrates an example of signal waveforms, (a) illustrates the position information signal Fsig(t), and (b) illustrates the sensor carrier signal (carrier wave signal) Fcarrier (t). When the sensor carrier signal Fcarrier (t) in (b) of FIG. 7 is modulated by the position information signal Fsig(t) in (a) of FIG. 7, the amplitude modulated wave FAM(t) shown in (c) of FIG. 7 is obtained. The amplitude modulated wave FAM(t) is input from the displacement sensor 73 into a differential amplifier 203.

The amplitude modulated wave FAM(t) and also a sensor reference signal Fstd(t) expressed by Formula (3) below are input the differential amplifier 203, and a differential signal Fsub (t) therebetween is output from the differential amplifier 203. The sensor reference signal Fstd(t) is formed by adjusting a gain of a carrier wave signal Fcarrier(t) using the gain adjusting section 202, and adjusting a phase to be equal with that of the amplitude modulated wave FAM(t) using the phase shift circuit 204.

$$F\text{std}(t) = C \sin(2\pi fct + \phi) \quad (3)$$

The sensor reference signal Fstd(t) has a waveform shown in (d) of FIG. 7, and the differential signal Fsub(t) expressed by Formula (4) below has a waveform shown in (e) of FIG. 7. The differential signal Fsub(t) output from the differential amplifier 203 undergoes, in a filter 205, a band-pass process with a carrier wave frequency (carrier frequency) fc being a center frequency.

$$F\text{sub}(t) = FAM(t) - F\text{std}(t) = (A + F\text{sig}(t) - C)\sin(2\pi fct + \phi) \quad (4)$$

The differential signal output from the filter 205 is fetched from the AD converter 34 (34A and 34B) into the digital control circuit 30 by synchronous sampling. Then, sampling is carried out based on the sine wave discrete value generated by the sine wave discrete value generating section 313, but when a carrier wave signal is modulated by the displacement sensor 73, the phase shifts. For this reason, a signal obtained by shifting the phase of the sine wave discrete value through a phase shift arithmetic section 312 depending on the shift is input into the AD converters 34. Thereafter, a demodulation arithmetic section 310 calculates a demodulation arithmetic output d3, described later. The calculated result is input into a control arithmetic section 311, and the control arithmetic section 311 calculates an electromagnet current control amount.

In FIG. 3, the sensor carrier signal that is output in synchronization with the AD converter 34 (34A and 34B) is output from the DA converter 31, but the present invention is not limited to this. For example, the sensor carrier signal may be obtained by once digitally PWM-modulation of a sensor carrier sine wave signal, digitally output of a high/low signal, and removal of a PWM component by the analog low-pass filter.

FIGS. 8(a) and 8(b) are diagrams qualitatively illustrating a sampling and demodulating process. FIG. 8(a) illustrates a process in this embodiment, and FIG. 8(b) illustrates a conventional process. In FIGS. 8(a) and 8(b), an oscillatory waveform W denotes a signal (sensor signal) to be input into the AD converters 34, and r denotes a noise component. For example, a noise caused by the electromagnet current is a noise component whose frequency is lower than a sampling frequency fs, and here it is approximately a DC noise in order to check a qualitative influence. Further, a case where a modulated wave is also modulated only by DC displacement is considered. For this reason, the noise component r is constant, and an amplitude of an input signal W also has a constant value d. That is to say, a signal to be input into the AD converters 34 is expressed such that (DC modulation)+(DC noise)=d×sin(2πfc×t)+r.

In this embodiment, when a signal is fetched by synchronous sampling, a signal is fetched at maximum peak timings (S11, S12, S13, S14, . . . ) and minimum peak timings (S21, S22, S23, S24, . . . ) of a sensor carrier in a relationship such that fc=(n+½)×fs. Reference symbol fc denotes a carrier frequency, and fs denotes a sampling frequency. An example shown in FIG. 8(*a*) show a case where n=0 (fs=2fc) in fc=(n+½)×fs. That is to say, the sampling is carried out at a peak timing that is the half period (1/(2×fc)) of a case of the carrier frequency fc (namely, a double frequency 2fc). A data value fetched at the maximum peak timings (S11, S12, S13, S14, . . . ) is denoted by d1(=d+r), and a data value fetched at the minimum peak timings (S21, S22, S23, S24, . . . ) is denoted by d2 (=−d+r).

The demodulation arithmetic section 310 in FIG. 6 conducts a calculation expressed by Formula (5) based on a sampling data value d1 fetched at the maximum peak timing S11 and a sampling data value d2 fetched at the minimum peak timing S21. Arrows S31 to S34 in FIGS. 8(*a*) and 8(*b*) indicate output timings of the calculated results, and in the example shown in FIGS. 8(*a*) and 8(*b*), the output timings S31 to S34 are set so as to be the same as the minimum peak timings S21 to S24. A calculated result d3 obtained based on the data values d1 and d2 at the maximum peak timing S11 and the minimum peak timing S21 is output as a demodulation calculated output at the output timing S31 (the same timing as the minimum peak timing S21).

$$d3=(d1-d2)/2 \qquad (5)$$

Similarly, the value d3 obtained based on the sampling data value d1 at the maximum peak timing S12 and the sampling data value d2 at the minimum peak timing S22 is output as a demodulation calculated output at the output timing S32 (the same timing as the minimum peak timing S22). The similar calculated outputs are output also at the output timings (S33, S34, . . . ). The output timings (S31, S32, S33, S34, . . . ) are set so as to be the same as the minimum peak timings (S21, S22, S23, S24, . . . ). As is clear from Formula (5), as to the DC noise, the noise component r is completely canceled. In the example shown in FIG. 8(*a*), a modulated wave is caused by DC displacement, the demodulation arithmetic output d3 is equal to the amplitude value d.

That is to say, the demodulation arithmetic output d3 is output at the minimum peak timings (S21, S22, S23, S24, . . . ) of a signal waveform with the carrier frequency fc (namely, a period 1/fc). The output timings (S31, S32, S33, S34, . . . ) of the demodulation arithmetic output d3 may be set to the same timings as the maximum peak timings (S11, S12, S13, S14, . . . ). For example, when the demodulation arithmetic output d3 is output at the maximum peak timing S12, the demodulation arithmetic output d3 is calculated based on the data value d2 at the minimum peak timing S21 and the data value d1 at the maximum peak timing S12.

Figure 8:
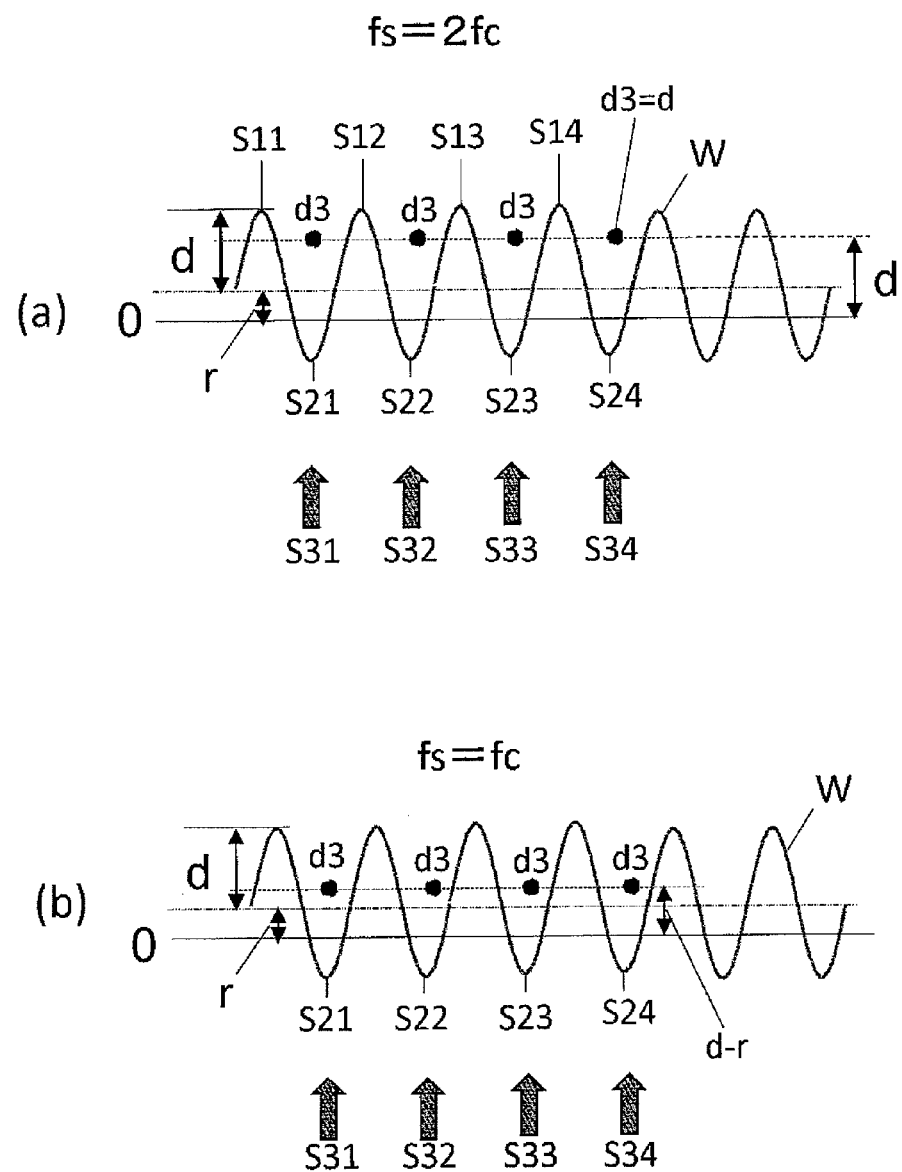
FIGS. 8(*a*) and 8(*b*) are diagrams qualitatively illustrating a sampling and demodulating process.

On the other hand, FIG. 8(*b*) illustrates a case where, different from this embodiment, a data value is fetched with fs=fc and at the minimum peak timing, and a demodulation arithmetic process d3 is output at the minimum peak timing. In this case, a value −d2 (=d−r) obtained by positively/negatively inverting the sampled data value d2 (=−d+r) is output as the demodulation arithmetic output d3. That is to say, the demodulation arithmetic output d3 includes a value r caused by a noise as an error. In such a manner, a mixed noise with a low frequency caused by the electromagnet current (control current) is also fetched as a modulated signal. As a result, a vibration component that does not actually displace (vibrate) is still mixed in a demodulated rotor displacement signal (displacement information), and the rotor displacement signal is fed back so as to be magnetically levitated. For this reason, the rotor is forcibly vibrated by the noise component, and its reaction force is transmitted to the pump case 21 to cause vibration on a pump main body 1.

However, in this embodiment, when the value d3=(d1−d2)/2 is calculated, the noise component r is approximately canceled, and a noise included in the demodulated rotor displacement signal can be reduced, so that pump vibration can be prevented.

Figure 9:
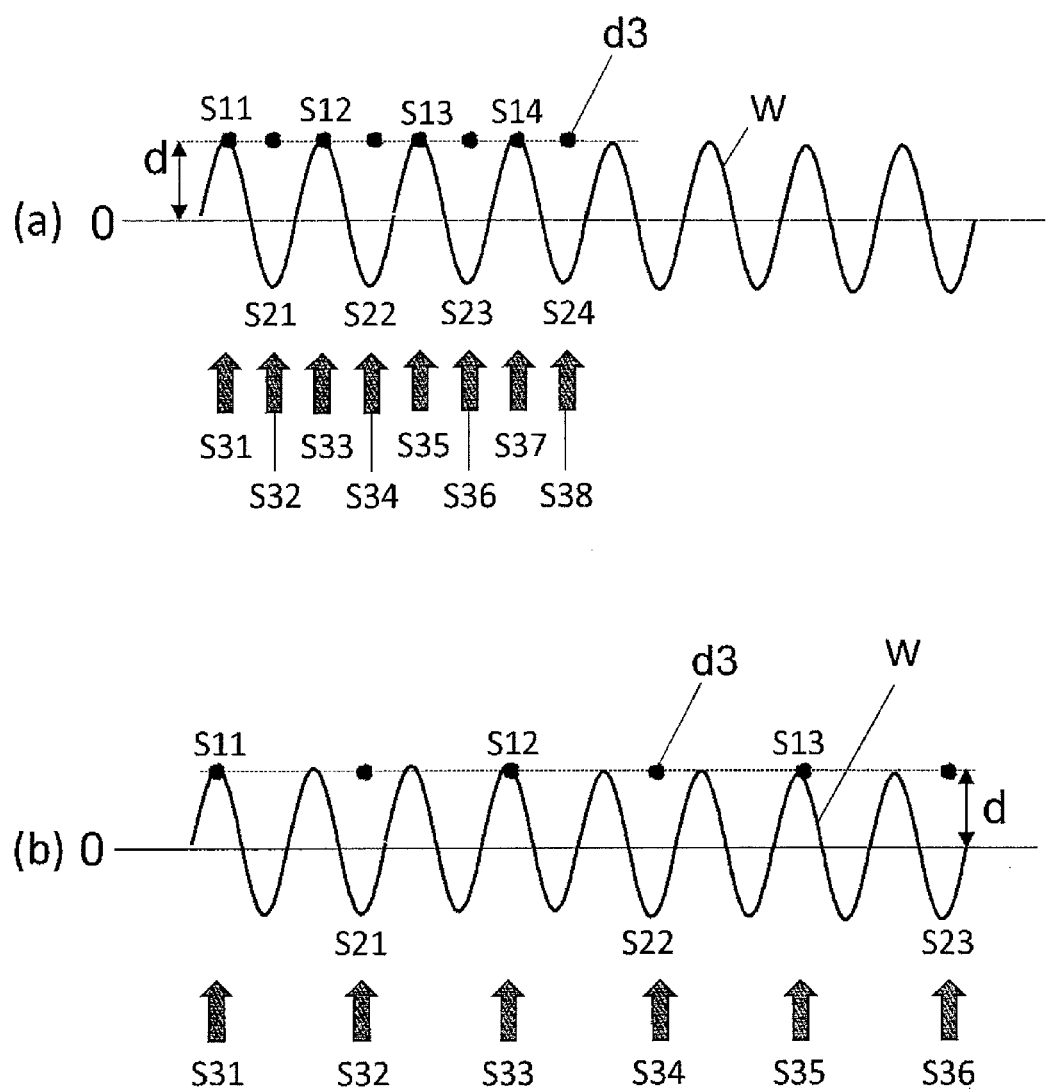
FIGS. 9(*a*) and 9(*b*) are diagrams illustrating another example of the sampling and demodulating process.

The example shown in FIG. 8 (*a*) illustrates the case where peak values (maximum peak value and minimum peak value) are sampled with the sampling frequency fs such that fs=2×fc, and the demodulation arithmetic output d3 is output at the peak timing in the period 1/fc, but the sampling timings and the output timings are not limited to this. FIGS. 9(*a*) and 9(*b*) illustrate a case where the sampling period is equal to the output period of the demodulation arithmetic output d3. FIGS. 9(*a*) and 9(*b*) illustrate the noise component r=0 in the input signal W, and the input signal W is expressed as d×sin (2πfc×t).

FIG. 9(*a*) illustrates a case where the peak value is sampled with fs=2×fc, and the demodulation arithmetic output d3 is output at the peak timing in the period 1/(2×fc) that is the same as the sampling period. When the peak value is sampled with fs=2×fc, the data value d1 at the maximum peak timings (S11, S12, S13, S14, . . . ) and the data value d2 at the minimum peak timings (S21, S22, S23, S24, . . . ) of the sensor carrier are fetched. The demodulation arithmetic output d3 (=(d1−d2)/2) is output at the output timings (S31, S32, S33, S34, S35, . . . ). The odd-numbered output timings (S31, S33, S35, S37, . . . ) are the same as the maximum peak timings (S11, S12, S13, S14, . . . ), and the even-numbered output timings (S32, S34, S36, S38, . . . ) are the same as the minimum peak timings (S21, S22, S23, S24, . . . ).

For example, when the demodulation arithmetic output d3 is output at the output timing S32 that is the same as the minimum peak timing S21, the demodulation arithmetic output d3 is calculated based on the data value d1 at the maximum peak timing S11 and the data value d2 at the minimum peak timing S21. On the other hand, when the demodulation arithmetic output d3 is output at the output timing S33 that is the same as the maximum peak timing S12, the demodulation arithmetic output d3 is calculated based on the data value d1 at the maximum peak timing S12 and the data value d2 at the minimum peak timing S21. That is to say, the demodulation arithmetic output d3 is calculated based on the two data values d1 and d2 fetched recently.

FIG. 9(*b*) illustrates a case where n=1 in fc=(n+½)×fs. In FIG. 9(*b*), the peak value is sampled with fs=(⅔)×fc, and the demodulation arithmetic output d3 is output at the peak timing in the period 1/((⅔)×fc) that is the same period as the sampling period. That is to say, the sampling is carried out twice in three periods of the carrier frequency fc, and the data value d1 at the maximum peak timing and the data value d2 at the minimum peak timing are fetched. The demodulation arithmetic output d3 is output at the timing at which the data values d1 and d2 are obtained.

For example, the demodulation arithmetic output d3 is output at the output timing S32 that is the same as the minimum peak timing S21 based on the data value d1 at the maximum peak timing S11 and the data value d2 at the minimum peak timing S21. Further, the demodulation arithmetic output d3 is output at the output timing S33 that is the same timing as the maximum peak timing S12 based on the data value d1 at the maximum peak timing S12 and the data value d2 at the minimum peak timing S21.

In the example shown in FIG. 10(a), the peak value is sampled with fs=2×fc, and the demodulation arithmetic output d3 is output at the minimum peak timing of the period 1/fc. The demodulation arithmetic output d3 is calculated based on the two data values d1 and d2 fetched recently. In comparison with the example shown in FIG. 9(a), output frequency of the demodulation arithmetic output d3 is reduced to ½. For this reason, in the case of FIG. 10(a), an arithmetic load can be reduced. On the other hand, in the case of FIG. 9(a), noises in a sensor signal including a higher-frequency component can be removed.

In an example shown in FIG. 10(b), the peak value is sampled with fs=(⅔)×fc, and the demodulation arithmetic output d3 is output at the minimum peak timing in a period 1/(fc/3) that is twice as large as the sampling period. In comparison with the example shown in FIG. 9(b), the output frequency of the demodulation arithmetic output d3 is reduced to ½. For this reason, the arithmetic load can be reduced more in the case shown in FIG. 10(b).

Figure 10:
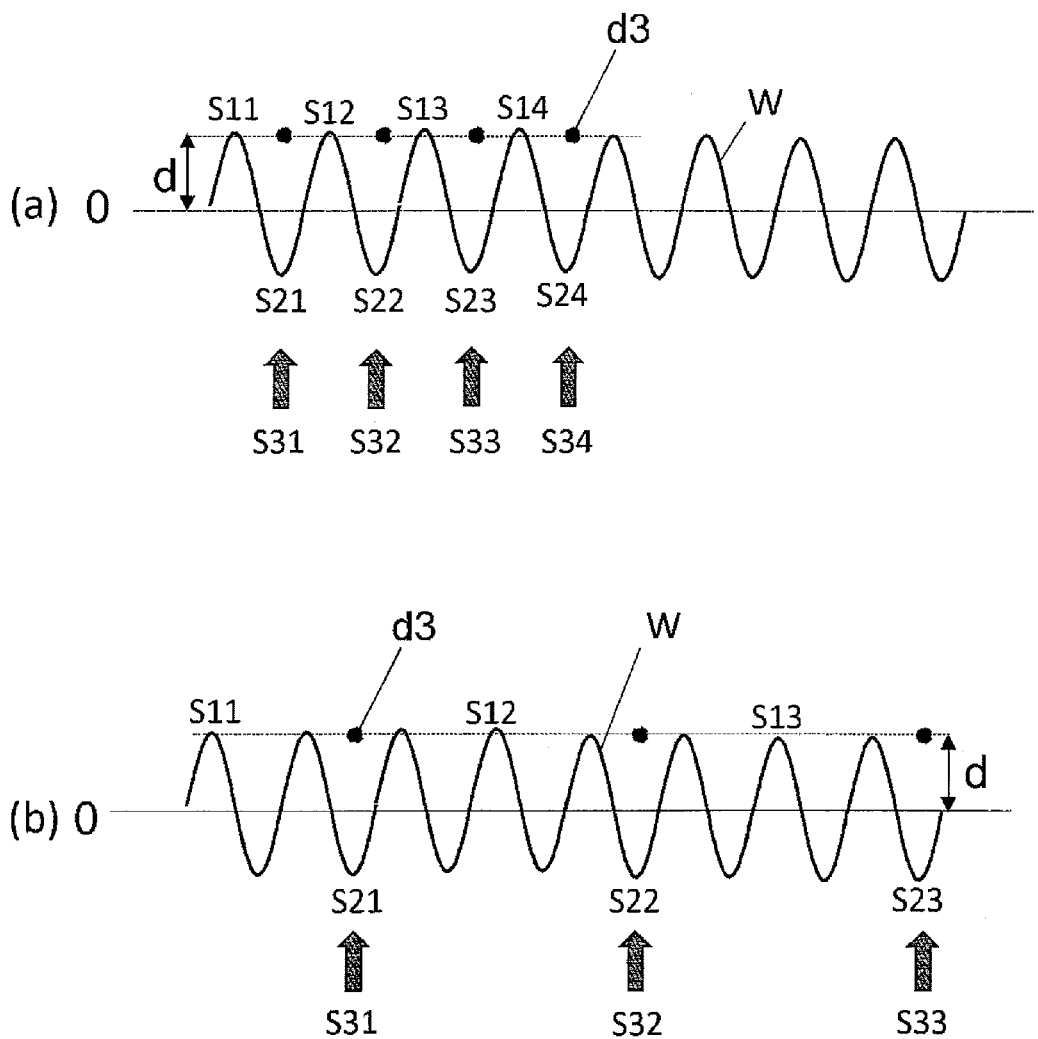
FIGS. 10(*a*) and 10(*b*) are diagrams illustrating another example of sampling and demodulating process.

As shown in FIGS. 8 to 10, in this embodiment, when the sampling is carried out in the relationship of fc=(n+½)×fs, the data values d1 at the maximum peak timings and the data values d2 at the minimum peak timings of the sensor carrier are fetched alternately. The demodulation arithmetic output d3 is output based on the data values d1 and d2 fetched around the output timing so that the noise component r is approximately canceled. The electromagnet current is controlled based on the calculated result d3, so that pump vibration caused by a noise can be prevented.

(Description about Five-Axis Control)

Like the five-axis control type magnetic bearing device shown in FIG. 3, when carrier waves with the same phase are applied to all the five-axis sensors at the same frequency, carrier wave components of sensor signals to be input into the AD converters 34 (34A and 34B) have the same phase between the axes using the sensors having the same constitution. In the example shown in FIG. 5, the X1-axis sensor 71x, the Y1-axis sensor 71y, the X2-axis sensor 72x, and the Y2-axis sensor 72y in the radial direction have the same constitution, and a difference is obtained between the output signals from the paired sensors provided on opposed positions.

On the other hand, a difference is calculated between the output signal from the sensor 73 in the axial direction and the sensor reference signal Fstd(t). Since different sensing systems are adopted in the radial direction and in the axial direction, the phases are greatly different between the X1 axis, Y1 axis, X2 axis and Y2 axis, and the Z axis.

In such a manner, the same constitution is adopted in the X1 axis, Y1 axis, X2 axis and Y2 axis as shown in FIG. 5, the signals of the same phase are input into the AD converters 34 (34A and 34B). When the sensor signal to be input into one of a plurality of input sections provided to the AD converters is sampled in synchronization with a maximum peak position and a minimum peak position of the sensor carrier, a sensor signal to be input with the same phase into the other input section of the same AD converter can be sampled only on positions displaced from the maximum peak position and the minimum peak position. For this reason, a reduction in a S/N ratio is not avoided. In the example shown in FIG. 3, since the two AD converters 34A and 34B are used, when sampling is carried out in the input sections ch1 of the AD converters 34A and 34B in synchronization with the maximum peak position and the minimum peak position, the sampling timings in the input sections ch2 of the AD converters 34A and 34B shift from the maximum peak position and the minimum peak position.

Since the phases are greatly different between the Z-axis signal and the X1-axis, Y1-axis, X2-axis and Y2-axis signals as described above, both a Y1-axis signal to be input into the input section ch1 and a Z-axis signal to be input into the input section ch3 are sampled in synchronization with the maximum peak position and the minimum peak position.

Figure 11:
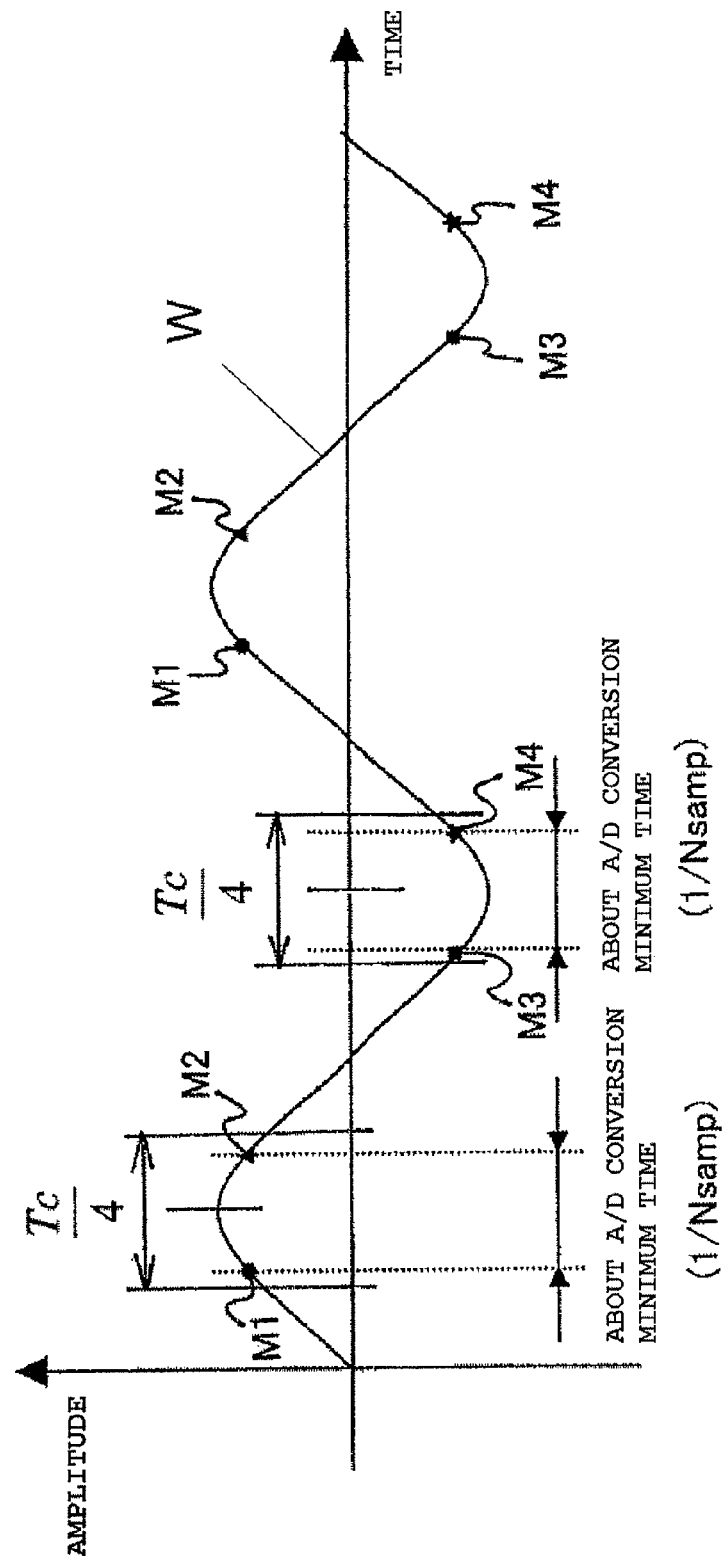
FIG. 11 is a diagram explaining a sampling timing.

Therefore, a method for, even when the sampling timings shift from the maximum peak position and the minimum peak position of the sensor carrier, repressing a reduction in the S/N ratio caused by the shift as much as possible is described below with reference to FIG. 11. FIG. 11 is a diagram illustrating the input signal (sensor signal) W similar to that shown in FIGS. 9(a) and 9(B). In this method, the sampling is carried out within a predetermined phase range centered on the maximum peak position and the minimum peak position of the sensor carrier, so that the reduction in the S/N ratio is repressed. The predetermined phase range is within ¼ of the carrier period Tc (=1/fc), namely, within 90 deg in phase. The sampling is carried out twice within this range.

The number of sampling times per second when the sampling is carried out at the maximum sampling speed of the AD converters 34A and 34B is denoted by Nsamp. In this case, one sampling takes 1/Nsamp second. For this reason, as shown in FIG. 11, when the carrier period Tc is set so that Tc>4/Nsamp, the sampling can be carried out twice within the range of Tc/4.

In the example shown in FIG. 11, the sampling at a first point M1 and a second point M2 is carried out on positions that are symmetrical with respect to the maximum peak position, and the sampling at a third point M3 and a fourth point M4 are carried out on positions that are symmetrical with respect to the minimum peak position. In the AD converter 34A, the odd-numbered sampling points (M1 and M3) are sampling points relating to the X1 axis, and the even-numbered sampling points (M2 and M4) are sampling points relating to the X2 axis. The similar process is executed on the X2 axis and the Y2 axis of the AD converter 34B.

Such samplings are carried out so that the reduction in a signal level can be repressed. When the sampling is carried out twice within the range Tc/4, for example, even when the sampling is carried out on a position of ±45 deg separated farthest from the maximum peak position and the minimum peak position, the reduction in the signal level can be repressed from the values d on the maximum peak position and the minimum peak position to d·sin(45 deg)=0.707d.

Figure 12:
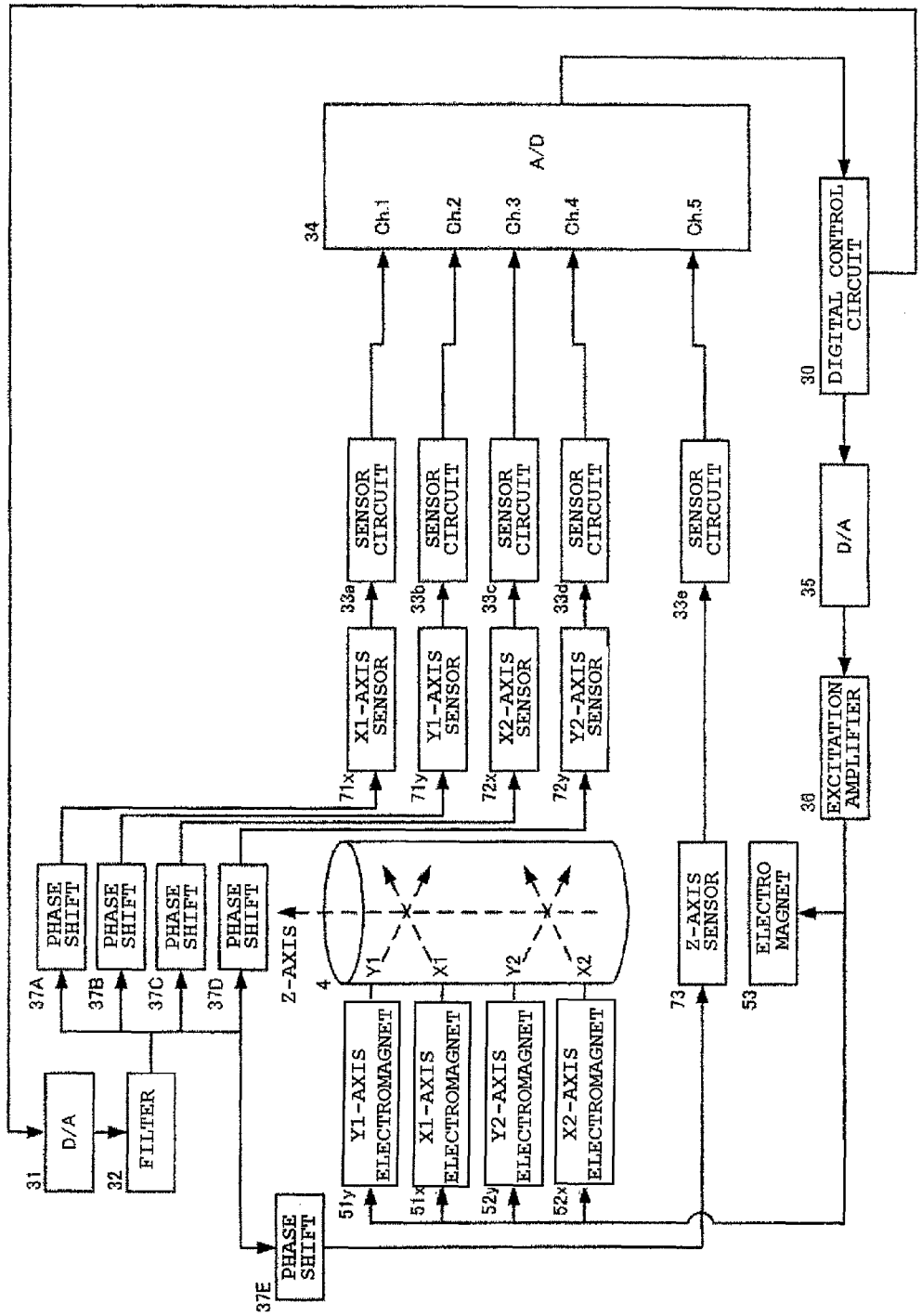
FIG. 12 is a block diagram illustrating another example of a constitution of a five-axis control type magnetic bearing.

A constitution shown in FIG. 12 may be adopted instead of the case where the two AD converters 34A and 34B are provided and the sampling process shown in FIG. 11 is executed. In the example shown in FIG. 12, phase shift circuits 37A to 37E are provided on a previous stage of the sensors 71x to 73, so that the phases of the sensor carrier signals to be input into one AD converters 34 are shifted.

In a block diagram shown in FIG. 12, the sensor carrier signal output from the filter 32 is input into the phase shift circuits 37A to 37E. The sensor carrier signal whose phase shifted by the phase shift circuit 37A is input into the X1-axis sensor 71x. Similarly, the sensor carrier signals whose phases are shifted by the phase shift circuits 37B to 37E are input into the sensors 71y, 72x, 72y, and 73, respectively. The phase shift amounts of the phase shift circuits 37A to 37E are set so that the sensor signals input into the input sections ch1 to ch5 of the AD converters 34 can be sampled in synchronization with the maximum peak position and the minimum peak position of the sensor carrier.

In the example shown in FIG. 12, the phase shift circuits are provided to all the five axes so that the phase adjustment is the easiest, but they do not have to be provided to all the five axes. For example, the sensor carrier signal that is output from the filter 32 is input directly into the X1 axis and the Y1 axis, and the sensor carrier signals whose phases are shifted by 90 deg by using the phase shift circuits are input into the X2 axis and the Y2 axis. The sampling on the X1, Y1, X2 and Y2 axes can be carried out in synchronization with the maximum peak position and the minimum peak position of the sensor carrier.

Second Embodiment

The first embodiment describes the magnetic bearing type turbo-molecular pump having the displacement sensor type magnetic bearing device. A second embodiment, however, describes a magnetic bearing type turbo-molecular pump having a magnetic bearing device with a position sensing function in addition to the original axis supporting function. Hereinafter, the self-sensing type magnetic bearing device having a position sensing function is called as a sensorless magnetic bearing device. In the magnetic bearing type turbo-molecular pump having the sensorless magnetic bearing device, the radial sensors 71 and 72 and the axial sensor 73 shown in FIG. 1 are omitted.

Figure 13:
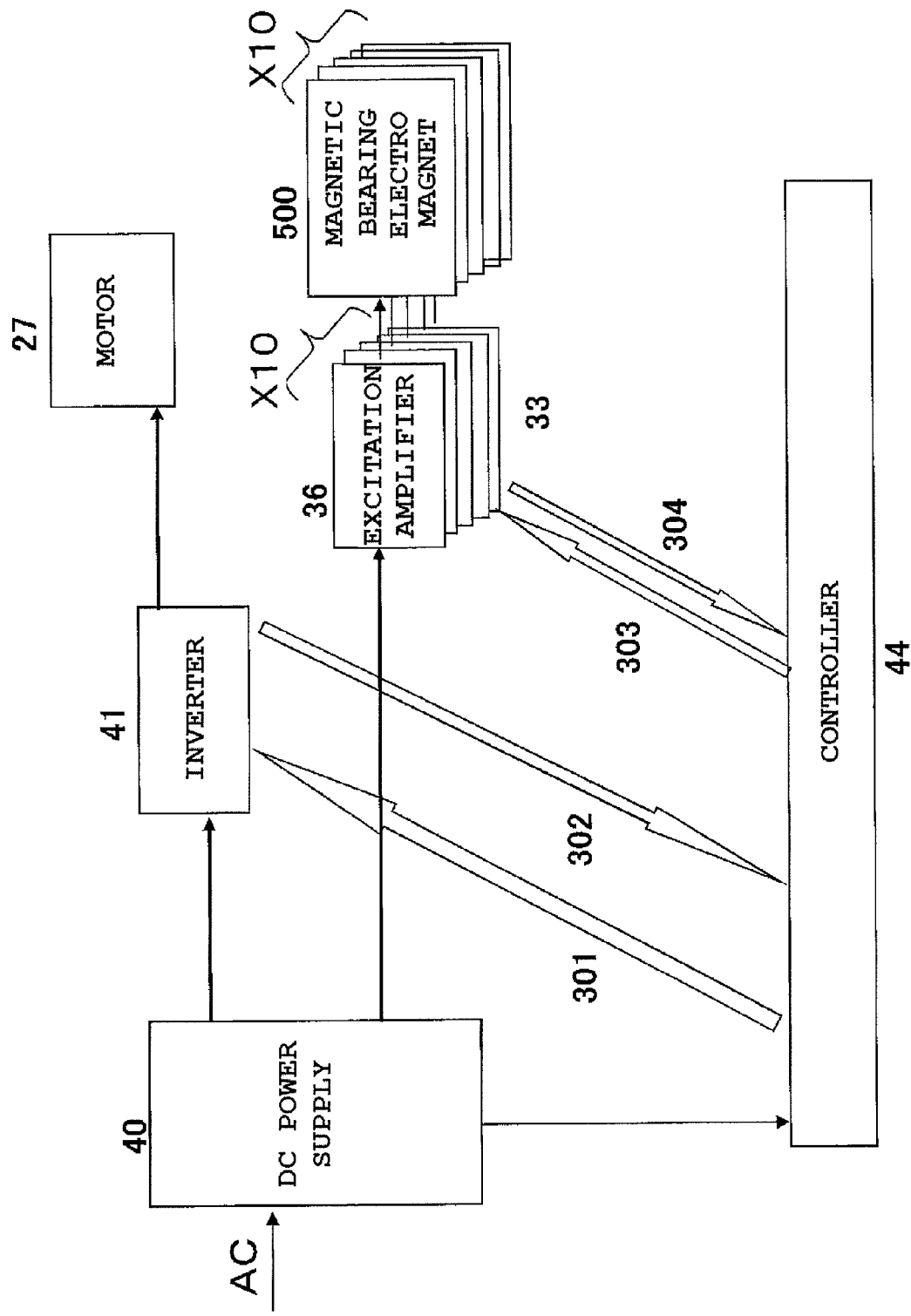
FIG. 13 is a block diagram illustrating a schematic constitution of a control unit of a sensorless magnetic bearing type turbo-molecular pump.

FIG. 13 is a block diagram illustrating a schematic constitution of a control unit of the sensorless magnetic bearing type turbo-molecular pump, and is the diagram corresponding to FIG. 2 in the first embodiment. In the case of the magnetic bearing type turbo-molecular pump having the sensorless magnetic bearing device, a sensor circuit for displacement sensor is omitted, but instead of this an electromagnet current on which a current component for sensing is superimposed is supplied to each of magnetic bearing electromagnets 500.

Figure 14:
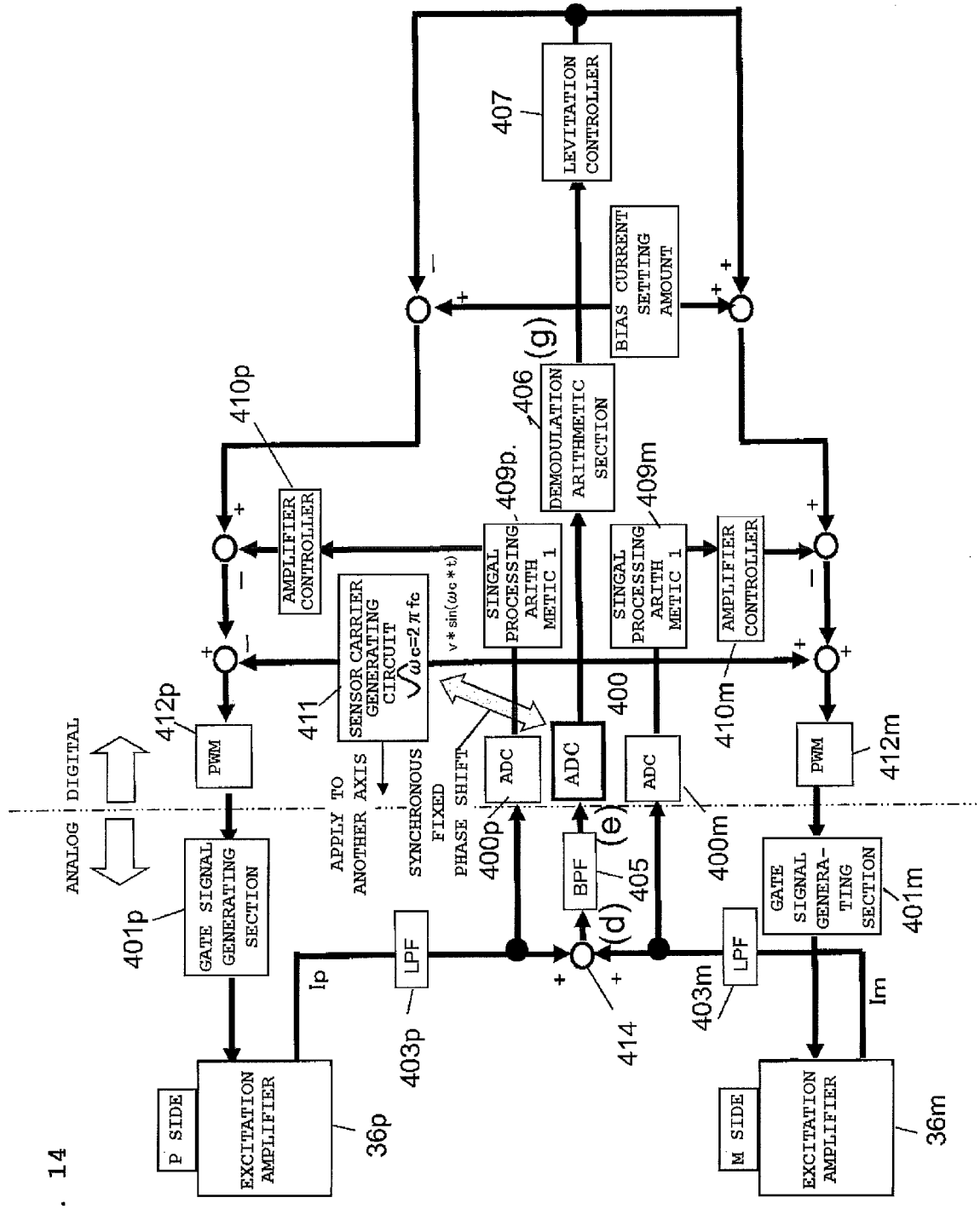
FIG. 14 is a block diagram explaining magnetic bearing control in a controller in a sensorless type case.

FIG. 14 is a functional block diagram illustrating magnetic bearing control in the controller 44, and illustrates one axis (for example, the X1 axis) in the five control axes. As described above, a pair (P side and M side) of the magnetic bearing electromagnets 500 is provided for one control, and excitation amplifiers 36 (36p and 36m) are provided to the magnetic bearing electromagnets 500, respectively. As shown in FIG. 4, current sensors 101A a and 101B for detecting the electromagnet current are provided to each of the excitation amplifiers 36, and a current detection signal is output from the ten excitation amplifiers 36.

A gate signal generating section 401p generates a gate driving voltage (gate signal) for driving the switching element of the excitation amplifier 36p on the P side based on a PWM control signal generated by a PWM arithmetic section 412p. Similarly, a gate signal generating section 401m generates a gate signal for driving the switching element of the excitation amplifier 36m on the M side based on a PWM control signal generated by a PWM arithmetic section 412m.

When the switching elements of the excitation amplifiers 36 (36p and 36m) are controlled to be on/off based on the gate signal, a voltage is applied to electromagnet coils of the magnetic bearing electromagnets 500, and currents Ip and Im flow. A current detection signal of the current Ip (denoted by Reference symbol Ip similar to the current) flowing in the magnetic bearing electromagnets 500 on the P side is output from the current sensors 101A and 101B of the excitation amplifier 36p on the P side. On the other hand, a current detection signal of the current Im (denoted by reference symbol Im similar to the current) flowing in the magnetic bearing electromagnet 500 on the M side is output from the current sensors 101A and 101B of the excitation amplifier 36m on the M side.

When the electromagnet current flowing in the magnetic bearing electromagnets 500 is separated into components according to respective functions, the electromagnet current flowing in the magnetic bearing electromagnets 500 includes a bias current ib, a levitation control current ic(t), and a current is of a sensor carrier component for position detection (isp on the P side and ism on the M side). Each of the components of the electromagnet current flowing in the opposed magnetic bearing electromagnets 500 is structured so that bias currents have the same code, the levitation control currents and the sensor carrier components have the opposite codes due to necessity of magnetic levitation control and necessity of satisfactory detection of a position signal (displacement signal). For this reason, the currents Ip and Im are expressed by Formula (6) below. Since the amplitudes of isp and ism have opposite codes in Formula (6), coefficients of isp and ism are plus.

$$Ip=ib+ic+isp$$

$$Im=ib-ic+ism \qquad (6)$$

The bias current ib is a direct current or an extremely low frequency band. The bias current ib is used as a bias for a force of balancing with respect to a gravity effecting on the rotor, linearity improvement of a levitation force and displacement sensing.

The levitation control current ic is a current to be used as a control force for levitating a rotor shaft 4 to a predetermined position. Since the levitation control current ic changes according to a fluctuation in a levitating position, its frequency band is changed from the direct current to 1 kHz order.

The sensor carrier component is a current component to be used for detecting levitating position displacement of the rotor shaft 4. A frequency in the frequency band of several kHz to several dozens kHz (1 kHz<<fc<<100 kHz) is normally used for the sensor carrier component is in order to repress the influence of the levitation control force.

In general, a voltage control type PWM amplifier is employed as the excitation amplifiers 36 (36p and 36m) in industrial magnetic bearings. That is to say, the voltage to be applied to the electromagnet coils of the magnetic bearing electromagnets 500 is controlled so that the electromagnet current is controlled. For this reason, as to determination of the codes of the bias current, the levitation control current and the sensor carrier component, a code relationship is generated by a voltage control signal before application of the voltage.

Since the sensor carrier components vsp and vsm in the voltages Vp and Vm to be applied to the electromagnet coils are applied with opposite phases, they are expressed by Formula (7) below. Here, $\omega c = 2\pi fc$, and fc denotes a sensor carrier frequency. Further, t denotes time, and v denotes a constant amplitude value.

$$vsp=-v\times\sin(\omega c\times t)$$

$$vsm=v\times\sin(\omega c\times t) \qquad (7)$$

When a gap between the rotor shaft 4 and the magnetic bearing electromagnets 500 is large, an inductance value of the electromagnet coil is small, and when the gap is small, the inductance value is large. Therefore, when the inductance value of one of the opposed electromagnet coils is increased, the inductance value of the other electromagnet coil is reduced. That is to say, inductance change in the opposed electromagnet coils enables the gap change, namely, the displacement information about the rotor shaft 4 to be obtained.

The inductances Lp and Lm of the electromagnet coil on the P side and the electromagnet coil on the M side approximately satisfy Formula (8) below. Reference symbol D denotes a gap in a case where the rotor shaft 4 is at a levitation center axis (levitation target position), and d in Formula (8) denotes displacement from the levitation target position. Reference symbol A denotes a constant.

$$1/Lp = A \times (D-d)$$

$$1/Lm = A \times (D+d) \quad (8)$$

When a coil resistance is approximately ignored, a relationship between the voltage to be applied to the electromagnet coil and the current flowing in the electromagnet coil in the sensor carrier component can be expressed by Formula (9) below.

$$vsp = Lp \times d(isp)/dt$$

$$vsm = Lm \times d(ism)/dt \quad (9)$$

According to Formulas (7), (8) and (9) above, the sensor carrier components isp and ism of the current flowing in the electromagnet coils are expressed by Formula (10) below. Here, $B = v \times A/\omega c$. Since the amplitudes of the sensor carrier components isp and ism are modulated due to a time change in the displacement d, the displacement information can be obtained by detecting these components.

$$\begin{aligned} isp &= -v \times \sin(\omega c \times t - \pi/2)/(\omega c \times Lp) \\ &= -B(D-d) \times \sin(\omega c \times t - \pi/2) \\ ism &= v \times \sin(\omega c \times t - \pi/2)/(\omega c \times Lm) \\ &= B(D+d) \times \sin(\omega c \times t - \pi/2) \end{aligned} \quad (10)$$

The total currents Ip and Im flowing in the magnetic bearing electromagnets 500 on the P and M sides are expressed by Formula (11) below.

$$Ip = ib + ic - B(D-d) \times \sin(\omega c \times t - \pi/2)$$

$$Im = ib - ic + B(D+d) \times \sin(\omega c \times t - \pi/2) \quad (11)$$

As shown in FIG. 14, current signals Ip and Im detected by the excitation amplifiers 36p and 36m are fetched by corresponding AD converters 400p and 400m via low-pass filters 403p and 403m. Further, the current signals Ip and Im that pass through the low-pass filters 403p and 403m are added by an adding section 414, and a sum signal (Ip+Im) is output from the adding section 414. Thereafter, the sum signal (Ip+Im) is input into the AD converter 400 via a band-pass filter 405 where a sensor carrier frequency fc is a center frequency, and is fetched by the AD converter 400.

The AD converter 400 fetches data through synchronous sampling based on a sensor carrier signal (the sensor carrier component) generated by a sensor carrier generating circuit 411. Similarly to the first embodiment, sampling is carried out at a maximum peak position and a minimum peak position (or the vicinity of the maximum peak position and the vicinity of the minimum peak position) with the sampling frequency fs that satisfies $fc = (n+\frac{1}{2}) \cdot fs$ with respect to the frequency fc of the sensor carrier signal.

The sum signal (Ip+Im) fetched by the AD converters 400 is input into a demodulation arithmetic section 406. The demodulation arithmetic section 406 calculates a demodulation arithmetic output $d3 = (d1-d2)/2$ based on a data value d1 on the maximum peak position and a data value d2 on the minimum peak position fetched through sampling. A magnetic levitation controller 407 generates levitation control current setting through proportional control, integral control, derivative control, and phase correction based on displacement information from the demodulation arithmetic section 406. A current obtained by subtracting the levitation control current setting from a bias current setting amount is used for controlling P side, and a current obtained by adding the levitation control current setting to the bias current setting amount is used for controlling the M side.

On the other hand, current detection signals Ip and Im fetched by the AD converters 400p and 400m are input into corresponding signal processing arithmetic sections 409p and 409m, respectively. The signal processing arithmetic sections 409p and 409m calculate information about current components (the bias current ib and the levitation control currents ic) that contribute to the levitation control force based on the sampling data. For example, the AD converters 400p and 400m fetch signal data such that fs=fc, and the signal processing arithmetic sections 409p and 409m execute a moving average process on the fetched signal data at the frequency fs.

The calculated result in the signal processing arithmetic section 409p is allowed to pass through an amplifier controller 410p, and then a subtracting process is executed on the result of subtracting the levitation control current from the bias current setting amount. The sensor carrier component ($v \times \sin(\omega c \times t)$) from the sensor carrier generating circuit 411 is further subtracted from the subtracted result, and the PWM control signal is generated by the PWM arithmetic section 412p based on this subtracted result. The gate signal generating section 401p generates the gate driving voltage (PWM gate signal) based on the PWM control signal generated by the PWM arithmetic section 412p.

Further, the calculated result of the signal process arithmetic section 409m is allowed to pass through the amplifier controller 410m, and then a subtracting process is executed on the result of adding the levitation control current setting to the bias current setting amount. The sensor carrier component ($v \times \sin(\omega c \times t)$) from the sensor carrier generating circuit 411 is further added to the subtracted result, and the PWM control signal is generated by the PWM arithmetic section 412m based on this added result. The gate signal generating section 401m generates the gate driving voltage based on the PWM control signal generated by the PWM arithmetic section 412m.

Since the opposed magnetic bearing electromagnets 500 of the respective axes have characteristic variations and magnetic fluxes interfere with each other between the axes in the vertical direction (for example, Y1 axis with respect to the X1 axis), the levitation control current is not completely the same as each other. Particularly, it is considered that as the frequency is higher, a difference of the currents is larger. In consideration of this, when the levitation control current on the P side is denoted by icp, and the levitation control current on the M side is denoted by icm, Formula (11) is expressed as Formula (12).

$$Ip = ib + icp - B(D-d) \times \sin(\omega c \times t - \pi/2)$$

$$Im = ib - icm + B(D+d) \times \sin(\omega c \times t - \pi/2) \quad (12)$$

The sum signal (Ip+Im) obtained by a sum operation of the current signals Ip and Im is expressed by Formula (13) below. Reference symbol $\Delta icpm$ in Formula (13) is such that $\Delta icpm = icp - icm$.

$$Ip + Im = 2 \times ib + \Delta icpm + 2 \times B \times d \times \sin(\omega c \times t - \pi/2) \quad (13)$$

The sum signal (Ip+Im) is input via the band-pass filter 405 whose center frequency is the sensor carrier frequency fc. In consideration of an influence of a signal delay due to the filter, however, the narrowing of the band of the band-pass filter 405 is naturally limited. For this reason, even when the sum signal (Ip+Im) is allowed to pass through the band-pass filter 405, a noise caused by the superimposed control current component remains in an input signal of the AD converter 400.

Therefore, the AD converter 400 is constituted similarly to the AD converter 34 (34A and 34B) in the first embodiment, and the sampling process similar to that shown in FIGS. 8 to 10 is executed. The demodulation arithmetic section 406 calculates a demodulation arithmetic output d3=(d1−d2)/2 based on the data value d1 on the maximum peak position and the data value d2 on the minimum peak position fetched through sampling.

The input signal of the AD converter 400 is obtained by allowing the signal (Ip+Im) expressed by Formula (13) to pass through the band-pass filter 405. Ideally, all the signals other than the modulation wave signal should be cut, but sufficient filtering cannot be carried out due to trade-off with respect to prevention of a signal delay essential to levitation control. Therefore, in the qualitative description in FIGS. 8 to 10, the signal of Formula (13) is the input signal of the AD converters 400 for convenience.

In Formula (13), the bias current ib may be considered as constant (direct current). In the case of the magnetic bearing type turbo-molecular pump, normally, since the levitation control currents ic is a signal obtained by PID-operating a displacement signal, the frequency band Δicpm is a wide band from the direct current to about 2 kHz contributing to a control response. Further, the rotor displacement (the displacement of the rotor shaft 4) depends also on a rotor dimension, but in the general magnetic bearing type turbo-molecular pump, the band is normally in the range between the direct current and about 1 kHz, and is equivalent to or narrower than the band of the levitation control current ic. In comparison with the above case, the sensor carrier frequency fc is about 10 kHz that is higher. For this reason, the frequencies of the levitation control current ic and the displacement d are about $\frac{1}{10}$ that is low with respect to the sensor carrier frequency fc, and the levitation control current ic and the displacement slowly change compared to the change in the sensor carrier signal.

On the other hand, since the sampling frequency fs at the time of fetching into the AD converters 400 is sufficiently high with respect to the levitation control current ic and the displacement d, variations of the displacement d and the value Δicpm are small and the bias current ib is constant at adjacent sampling timings. Therefore, the data value d1 on the maximum peak position and the data value d2 on the minimum peak position in FIGS. 8(*a*) and 8(*b*) are expressed by Formula (14) below. As a result, similarly to the first embodiment, when the demodulation arithmetic output d3=(d1−d2)/2 is calculated based on the data values d1 and d2, d3=d. For this reason, the use of the demodulation arithmetic output d3 enables cancellation of the levitation control current component that includes an AC component other than a DC component.

$$d1 \text{ is nearly equal to } (ib+\Delta icpm+d)$$

$$d2 \text{ is nearly equal to } (ib+\Delta icpm-d) \quad (14)$$

Figure 15:
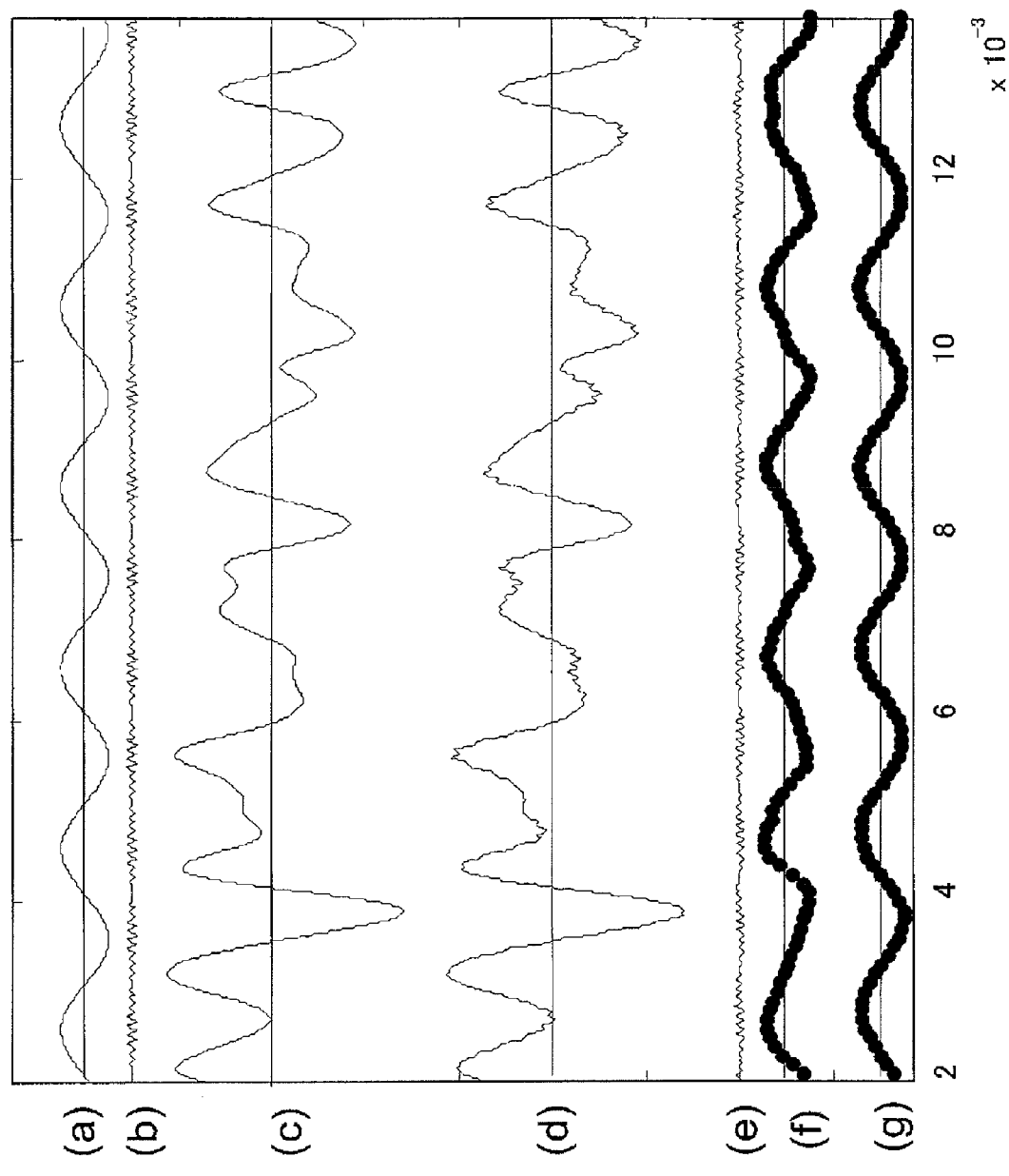
FIG. 15 is a diagram illustrating examples of signal waveforms in stages (a) to (g)

FIG. 15 illustrates an example of signal waveforms at respective stages (the following stages (a) to (g) in a series of a process on a signal output from the adding section 414 in FIG. 14. The signal waveforms at the stages (d), (e) and (g) are signal waveforms on portions denoted by Reference symbols (d), (e) and (g) in FIG. 14. The signal waveforms at the stages (a) to (g) illustrate a case where when displacement due to vibration of the rotor shaft 4 in an axial direction at 500 Hz is demodulated, a random noise is mixed at a stage of a current signal.

The signal at the stage (a) represents displacement when the rotor shaft 4 forcibly vibrates at 500 Hz. The signal at the stage (b) represents a modulation wave signal obtained by modulating the sensor carrier signal (10 kHz) according to displacement at the stage (a). The signal at the stage (c) represents a random noise component to be mixed in the signal at the stage (b). The random noise component includes the levitation control currents.

The signal at the stage (d) represents a signal of Reference symbol (d) in FIG. 14 that is obtained by adding the signal at the stage (c) to the signal at the stage (b). The signal at the stage (e) represents a signal of Reference symbol (e) in FIG. 14 that is obtained by allowing the signal at the stage (d) to pass through the band-pass filter 405. The band-pass filter 405 is a secondary filter in which the center frequency is fc and Q value=5.

The signal at the stage (f) represents a demodulation calculated output in a case where the AD converter carries out the fetching operation and the demodulation arithmetic under a different condition from that in this embodiment. Here, the data value is obtained by fetching a minimum peak value with fs=fc=10 kHz and demodulating and outputting the value at the minimum peak timing with fs=fc (the sampling condition applied in FIG. 8(*b*)).

The signal at the stage (g) is a signal of Reference symbol (g) in FIG. 14, obtained by applying the fetching in the AD converters 400 and the arithmetic process in the demodulation arithmetic section 406 in this embodiment to the signal at the stage (e). Here, the data value is obtained by fetching the peak value with fs=2fc=20 kHz and demodulating and outputting the peak value at the minimum peak timing with fs=fc (the sampling condition and the output condition applied in FIG. 8(*a*)).

In any cases of the stage (f) and the stage (g), a sine wave output of 500 Hz that is a wave to be modulated is obtained as a demodulation output, but a lot of waveform distortions occur in the signal at the stage (f) due to the influence of a random noise. On the contrary, the signal at the stage (g) to which the present invention is applied has a waveform close to the sine wave of 500 Hz.

Figure 16:
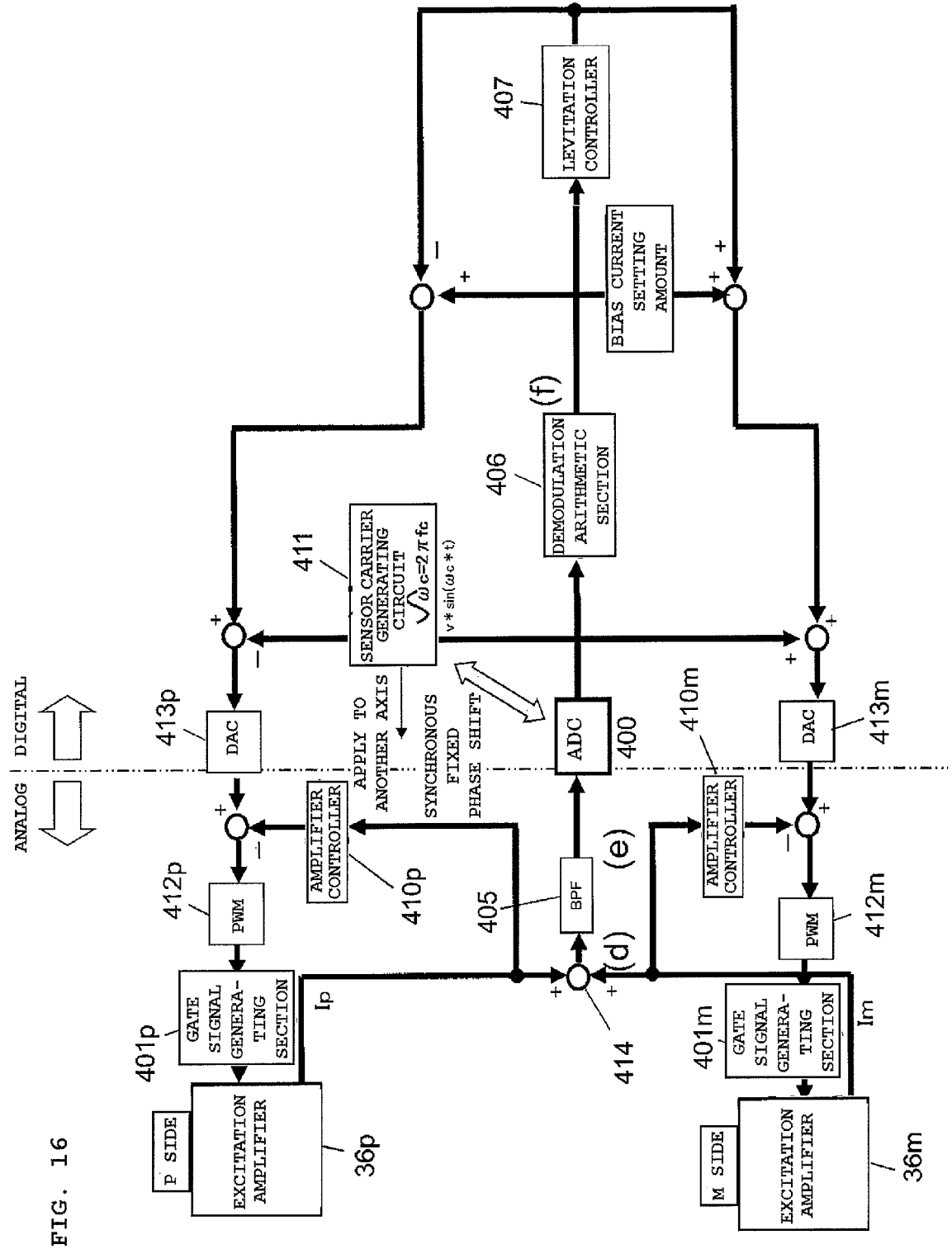
FIG. 16 is a diagram illustrating another constitution in the sensorless type case.

In the example shown in FIG. 14, the digital process including the generation of the PWM control signals for the excitation amplifiers 36*p* and 36*m* is executed. However, as shown in FIG. 16, a control current including a bias current on which a sensor carrier is superimposed may be output from DA converters 413*p* and 413*m*.

In the constitution of FIG. 14, since the digital process covering the generation of the PWM control signal is executed, the PWM signal output to be a gate signal is a binary signal of H/L. For this reason, the digital output is carried out without limiting to the conventional output of the DA converter output. In the description with reference FIG. 14, the current signals Ip and Im are fetched with fs=fc, and the fetched signal data is subject to the moving average process with the frequency fs, but the method for fetching the current signals Ip and Im is not limited to this.

In the second embodiment, the sum signal (Ip+Im) is fetched by the AD converters 400, but the present invention is not limited to this, and for example, Reference symbols vsp and vsm shown in Formula (7) are changed into the same code (+v for both of them), and the present invention can be similarly applied also to a constitution where a difference signal (Ip−Im) is fetched.

As described above, the magnetic bearing device according to the first embodiment for supporting the rotor shaft 4 as a body to be supported using the electromagnet 500 in a non-contact manner includes the sine wave discrete value generating section 313 for generating a sine wave discrete value by a digital arithmetic process, the DA converter 31 for DA-converting the sine wave discrete value so as to generate a carrier wave signal, the sensors 71 to 73 for modulating the carrier wave signal depending on a supporting position of the rotor shaft 4 so as to output a modulation wave signal, AD converting sections 34a and 34b for, when the frequency of the carrier wave signal is denoted by fc and a sampling frequency is denoted by fs, AD-converting the modulation wave signal into a digital signal at the sampling frequency fs that satisfies fc=(n+½)·fs (n is an integer of not less than 0) and at a predetermined timing that synchronizes with the sine wave discrete value, the demodulation arithmetic section 310 for performing the demodulation arithmetic based on the AD-converted digital signal, and the controller 44 for controlling the current of the electromagnets 500 based on the demodulation calculated result of the demodulation arithmetic section 310 so as to control the supporting position of the rotor shaft 4.

The predetermined timing is set to a timing at which a sampling timing is in a vicinity of the maximum peak position of the carrier wave signal and a timing at which the sampling timing is in a vicinity of the minimum peak position, and the demodulation arithmetic section 310 outputs the value d3 calculated according to d3=(d1−d2)/2 based on the data value d1 sampled in the vicinity of the maximum peak position and the data value d2 sampled in the vicinity of the minimum peak position as the demodulation calculated result.

As a result, a noise included in the demodulation calculated result d3 (a noise caused by the electromagnet current) can be reduced, and the S/N ratio of displacement information (the displacement signal) in the magnetic bearing control can be improved. Further, a vibration component of an electromagnet current control can be prevented from being mixed in the displacement information fed back to the levitation control, and the rotor shaft 4 as the body to be supported can be prevented from being forcibly vibrated by the noise component.

Further, also in the sensorless magnetic bearing device, the modulation wave signal is AD-converted into a digital signal at the sampling frequency fs that satisfies fc=(n+½)·fs (n is an integer of not less than 0) and at the predetermined timing that synchronizes with the sensor carrier signal (carrier wave signal) generated by the sensor carrier generating circuit 411. The predetermined timing is set to the timing at which the sampling timing is in the vicinity of the maximum peak position of the carrier wave signal and the timing at which the sampling timing is in the vicinity of the minimum peak position, and the value d3 calculated according to d3=(d1−d2)/2 is demodulated and calculated based on the data value d1 sampled in the vicinity of the maximum peak position and the data value d2 sampled at in the vicinity of the minimum peak position. As a result, the S/N ratio of the displacement signal in the magnetic bearing control can be improved.

Further, as shown in FIG. 11, the vicinity of the maximum peak position may be set to a phase range that is ¼ period of a carrier wave period (1/fc) centered on the maximum peak position, and the vicinity of the minimum peak position may be set to a phase range that is ¼ period of a carrier wave period (1/fc) centered on the minimum peak position. Such setting enables the S/N ratio of two-axis input signals input into one AD converter to be improved.

As to the timing of outputting the value d3, the value d3 may be output each time when the data values d1 and d2 are sampled, or may be output each time when any one of the data d1 and d2 is sampled.

The above description is merely one example, and thus the present invention is not limited to the above embodiments as long as the characteristics of the present invention are not impaired. Further, the above embodiments describe a turbo-molecular pump having a turbo pump stage and a drag pump stage as an example, but the present invention can be similarly applied to any vacuum pumps in which a rotor is supported by the magnetic bearing device.

What is claimed is:

1. A magnetic bearing device for supporting a body to be supported using an electromagnet in a non-contact manner, comprising:
   a sine wave discrete value generating section for generating a sine wave discrete value by a digital arithmetic process;
   a carrier wave generating section for generating a carrier wave signal based on the sine wave discrete value;
   a displacement detecting section for modulating the carrier wave signal depending on a supporting position of the body to be supported so as to output a modulation wave signal;
   an AD converting section for AD-converting the modulation wave signal into a digital signal at a sampling frequency fs that satisfies fc=(n+½)·fs (n is an integer of not less than 0) and at a predetermined timing that synchronizes with the sine wave discrete value when a frequency of the carrier wave signal is denoted by fc;
   a demodulation arithmetic section for performing demodulation arithmetic based on the AD-converted digital signal; and
   a controller for controlling a current of the electromagnet based on a demodulation calculated result of the demodulation arithmetic section so as to control the supporting position of the body to be supported, wherein
   the predetermined timing is a timing at which the sampling timing is in a vicinity of a maximum peak position of the carrier wave signal and a timing at which the sampling timing is in a vicinity of a minimum peak position, and
   the demodulation arithmetic section outputs, as the demodulation calculated result, a value d3 calculated with d3=(d1−d2)/2 when a data value of the digital signal sampled in the vicinity of the maximum peak position is denoted by d1 and a data value of the digital signal sampled in the vicinity of the minimum peak position is denoted by d2.

2. The magnetic bearing device according to claim 1, wherein
   the vicinity of the maximum peak position is set to a phase range that is a ¼ period of a carrier wave period (1/fc) centered on the maximum peak position, and
   the vicinity of the minimum peak position is set to a phase range that is a ¼ period of the carrier wave period (1/fc) centered on the minimum peak position.

3. The magnetic bearing device according to claim 1, wherein
   at each time when the data values d1 and d2 are sampled, the demodulation arithmetic section outputs the value d3 based on the data value obtained by the sampling and the data value obtained by the sampling shortly before the sampling.

4. The magnetic bearing device according to claim 1, wherein
at each time when any one of the data values d1 and d2 is sampled, the demodulation arithmetic section outputs the value d3 based on the data value obtained by the sampling and the data value obtained by the sampling shortly before the sampling.

5. A vacuum pump comprising:
a pump rotor including an evacuating function section;
a motor for driving the pump rotor; and
the magnetic bearing device according to claim 1 for supporting the rotor shaft of the pump rotor in a magnetic levitation manner.

6. A magnetic bearing device comprising:
a pair of electromagnets provided to a control axis, and arranged to be opposed with respect to a rotor shaft, the control axis provided in plural,
a carrier wave generating section for generating a carrier wave signal for detecting a change in a levitation position of the rotor shaft;
a plurality of excitation amplifiers for controlling a voltage to be applied to each of the electromagnets based on an electromagnet control signal on which the carrier wave signal is superimposed so as to supply an electromagnet current to each of the electromagnets;
a plurality of current sensors for detecting the electromagnet currents;
a modulation wave signal generating section for generating a modulation wave signal including levitation position change information based on detection signals of the current sensors in pairs provided correspondingly to the pair of electromagnets arranged in the opposed manner;
an AD converting section for AD-converting the modulation wave signal into a digital signal at a sampling frequency fs that satisfies fc=(n+½)·fs (n is an integer of not less than 0) and at a predetermined timing that synchronizes with the carrier wave signal when a frequency of the carrier wave signal is denoted by fc;
a demodulation arithmetic section for performing demodulation arithmetic based on the AD-converted digital signal; and
a controller for generating the electromagnet control signal based on a demodulation calculated result of the demodulation arithmetic section so as to control a levitation position of the rotor shaft, wherein
the predetermined timing is a timing at which the sampling timing is in a vicinity of a maximum peak position of the carrier wave signal and a timing at which the sampling timing is in a vicinity of a minimum peak position, and
the demodulation arithmetic section outputs, as the demodulation calculated result, a value d3 calculated with d3=(d1−d2)/2 when a data value of the digital signal sampled in the vicinity of the maximum peak position is denoted by d1, and a data value of the digital signal sampled in the vicinity of the minimum peak position is denoted by d2.

7. The magnetic bearing device according to claim 6, wherein
the vicinity of the maximum peak position is set to a phase range that is a ¼ period of a carrier wave period (1/fc) centered on the maximum peak position, and
the vicinity of the minimum peak position is set to a phase range that is a ¼ period of the carrier wave period (1/fc) centered on the minimum peak position.

8. The magnetic bearing device according to claim 6, wherein
at each time when the data values d1 and d2 are sampled, the demodulation arithmetic section outputs the value d3 based on the data value obtained by the sampling and the data value obtained by the sampling shortly before the sampling.

9. The magnetic bearing device according to claim 6, wherein
at each time when any one of the data values d1 and d2 is sampled, the demodulation arithmetic section outputs the value d3 based on the data value obtained by the sampling and the data value obtained by the sampling shortly before the sampling.

10. A vacuum pump comprising:
a pump rotor including an evacuating function section;
a motor for driving the pump rotor; and
the magnetic bearing device according to claim 6 for supporting the rotor shaft of the pump rotor in a magnetic levitation manner.

* * * * *